(12) United States Patent
Benzoni et al.

(10) Patent No.: US 6,981,806 B2
(45) Date of Patent: Jan. 3, 2006

(54) MICRO-HERMETIC PACKAGING OF OPTICAL DEVICES

(75) Inventors: Albert M. Benzoni, South Pasadena, CA (US); Henry A. Blauvelt, San Marino, CA (US); David W. Vernooy, Sierra Madre, CA (US); Joel S. Paslaski, Alhambra, CA (US)

(73) Assignee: Xponent Photonics Inc, Monrovia, CA (US)

( * ) Notice: Subject to any disclaimer, the term of this patent is extended or adjusted under 35 U.S.C. 154(b) by 215 days.

(21) Appl. No.: 10/613,226

(22) Filed: Jul. 3, 2003

(65) Prior Publication Data

US 2004/0052480 A1    Mar. 18, 2004

Related U.S. Application Data

(60) Provisional application No. 60/473,699, filed on May 27, 2003, provisional application No. 60/393,974, filed on Jul. 5, 2002.

(51) Int. Cl.
*G02B 6/00* (2006.01)
*G02B 6/36* (2006.01)

(52) U.S. Cl. ......................................... 385/94; 395/147
(58) Field of Classification Search .................. 385/14, 385/49, 50, 59, 76, 78, 88–95, 147; 333/246; 257/698, 728, 704, 710; 439/63
See application file for complete search history.

(56) References Cited

U.S. PATENT DOCUMENTS

| | | | |
|---|---|---|---|
| 5,123,070 A * | 6/1992 | Bradley | 385/37 |
| 5,737,467 A * | 4/1998 | Kato et al. | 385/92 |
| 6,028,497 A * | 2/2000 | Allen et al. | 333/246 |
| 6,238,100 B1 * | 5/2001 | Sasaki et al. | 385/59 |
| 6,400,009 B1 * | 6/2002 | Bishop et al. | 257/704 |
| 2003/0081902 A1 * | 5/2003 | Blauvelt et al. | 385/50 |
| 2003/0219192 A1 * | 11/2003 | Crafts et al. | 385/14 |
| 2004/0161186 A1 * | 8/2004 | Crafts et al. | 385/14 |

* cited by examiner

Primary Examiner—Akm Enayet Ullah
(74) Attorney, Agent, or Firm—David S. Alavi; Christie Parker & Hale LLP

(57) ABSTRACT

A method for micro-hermetic packaging of an optical device comprises: forming a micro-hermetic cavity on a substrate; providing a transmission optical waveguide transferring optical power between the interior and the exterior of the micro-hermetic cavity; fabricating or mounting at least one optical device within the micro-hermetic cavity; enabling optical power transfer between the optical device and the transmission optical waveguide; and sealing the optical device within the micro-hermetic cavity. The micro-hermetic cavity may be fabricated of a size comparable to the optical device, and many such cavities may be simultaneously fabricated on a single substrate using wafer-scale processing. The transmission optical waveguide, electrical feed-throughs, and/or other monitoring/controlling components may be provided with the micro-hermetic cavity on the same substrate, or as a separate component and/or on a separate substrate. Alternatively, the optical device, transmission optical waveguide, and any other associated components may be embedded in transparent material for hermetic sealing.

22 Claims, 16 Drawing Sheets

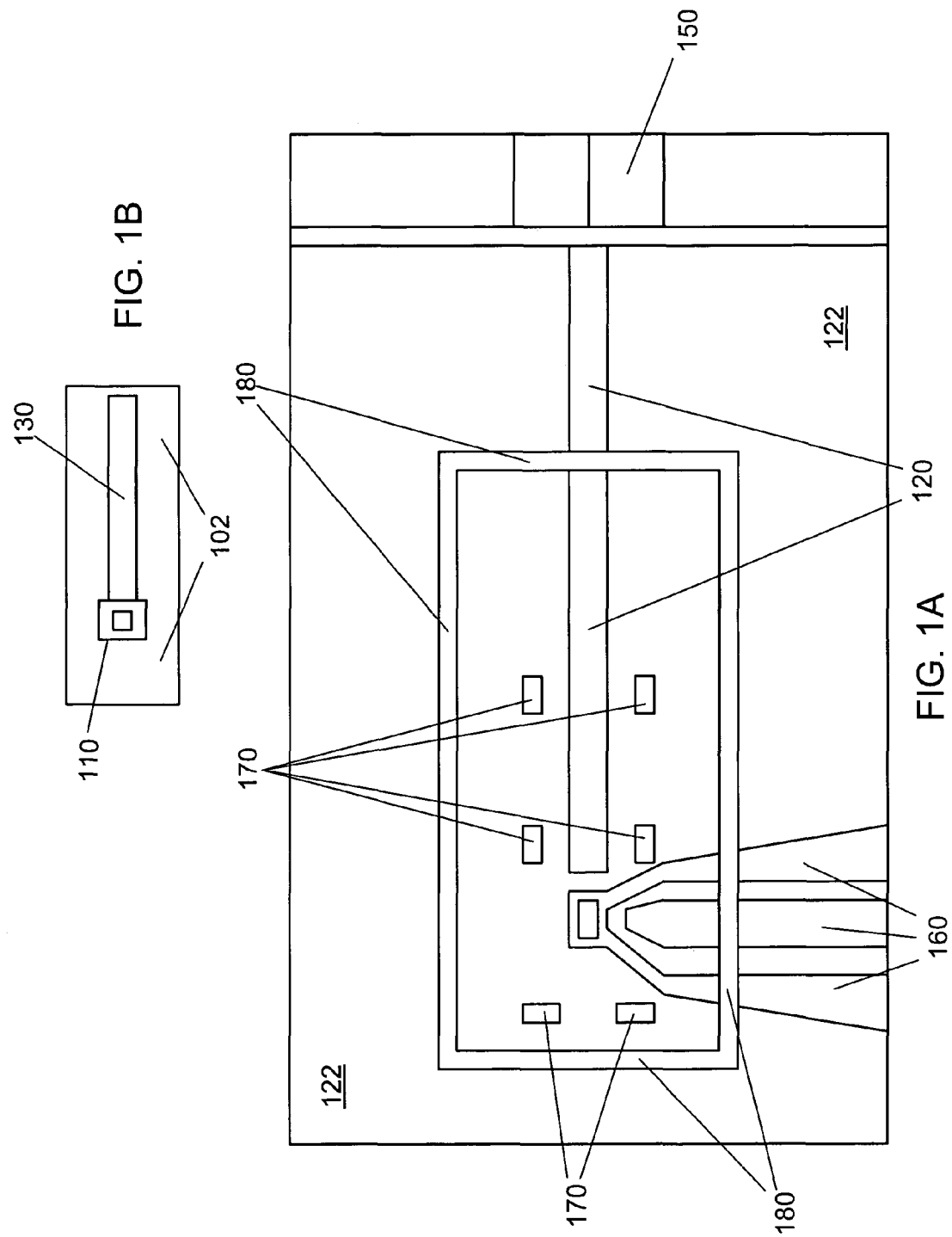

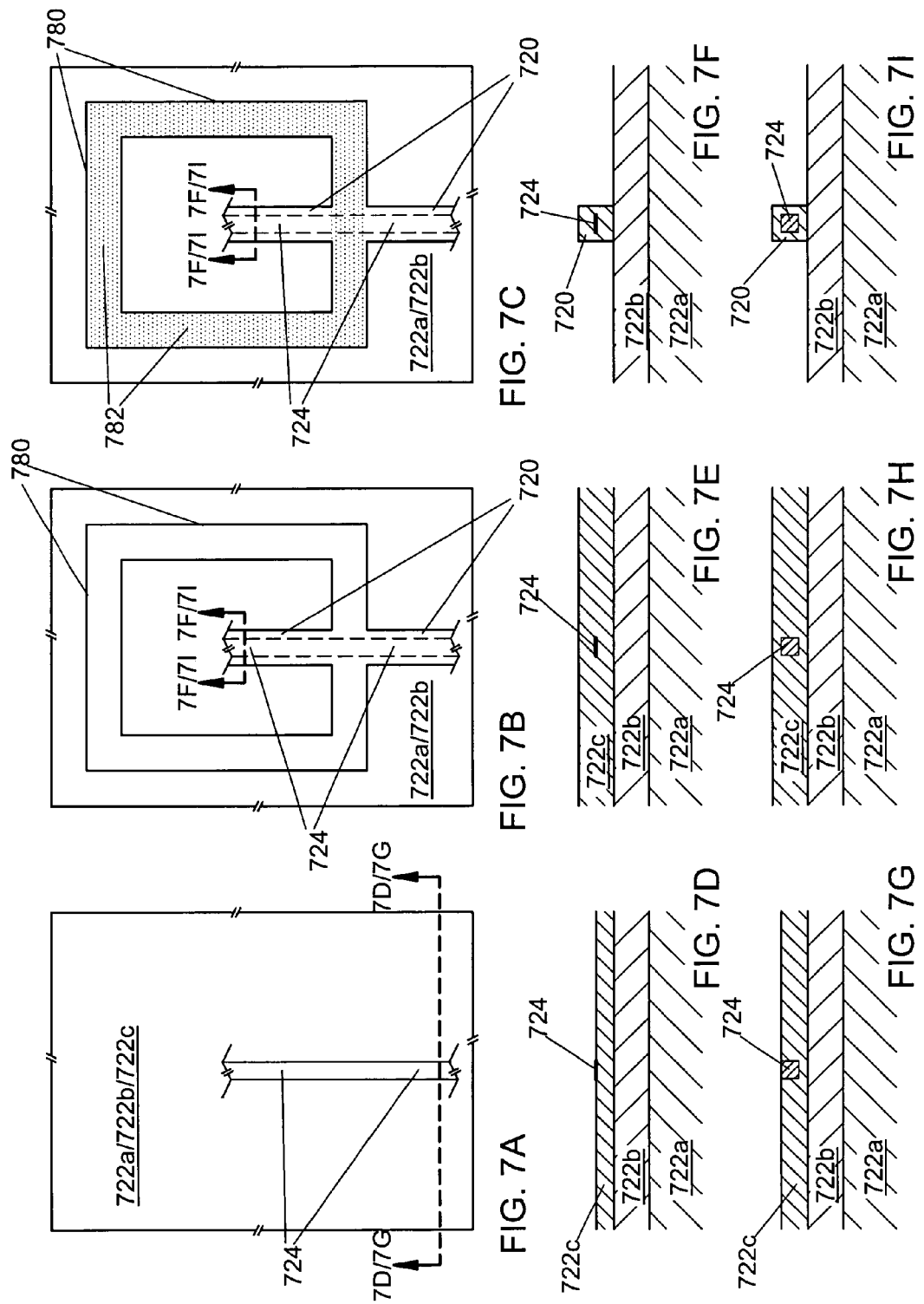

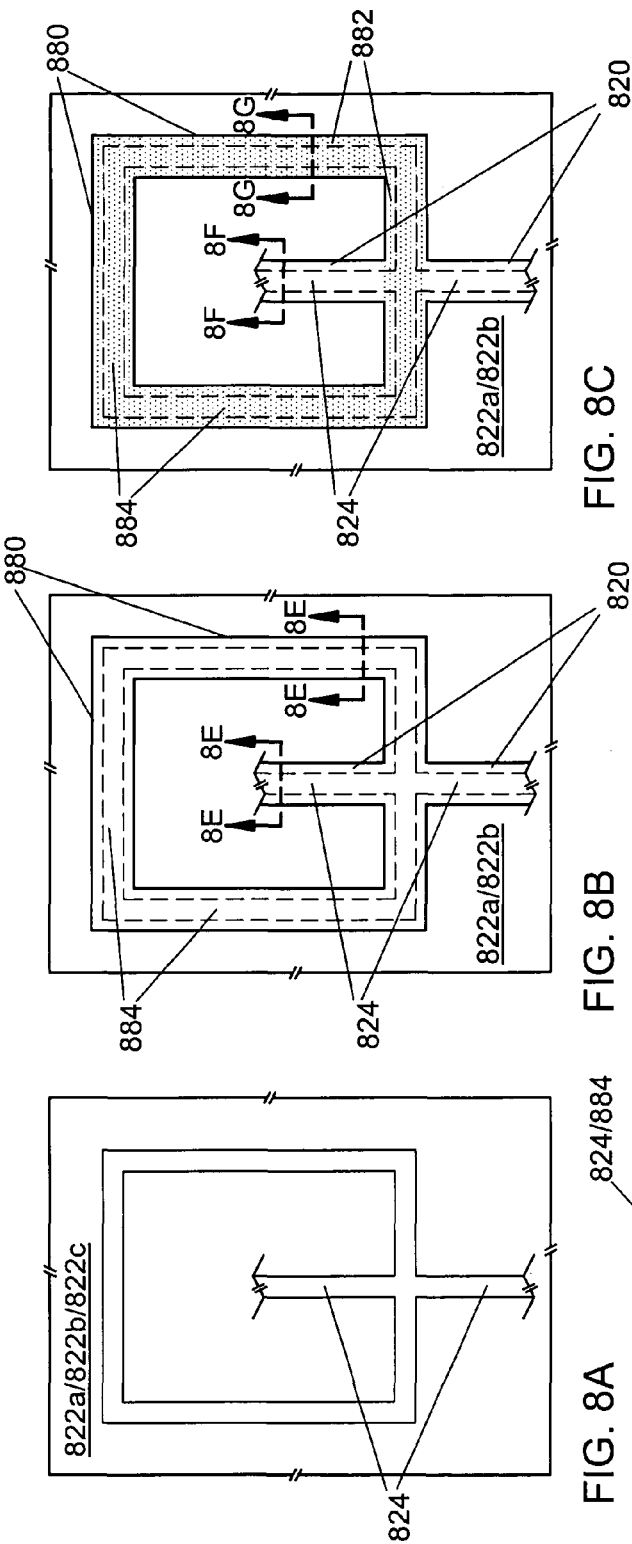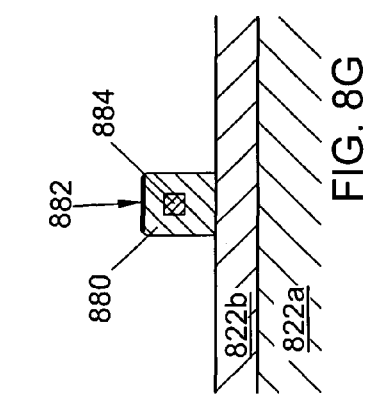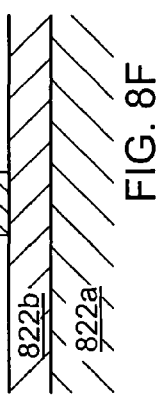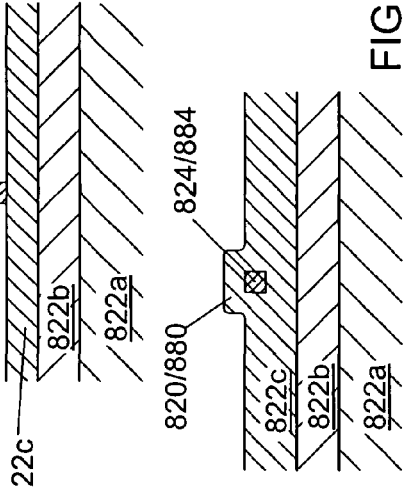

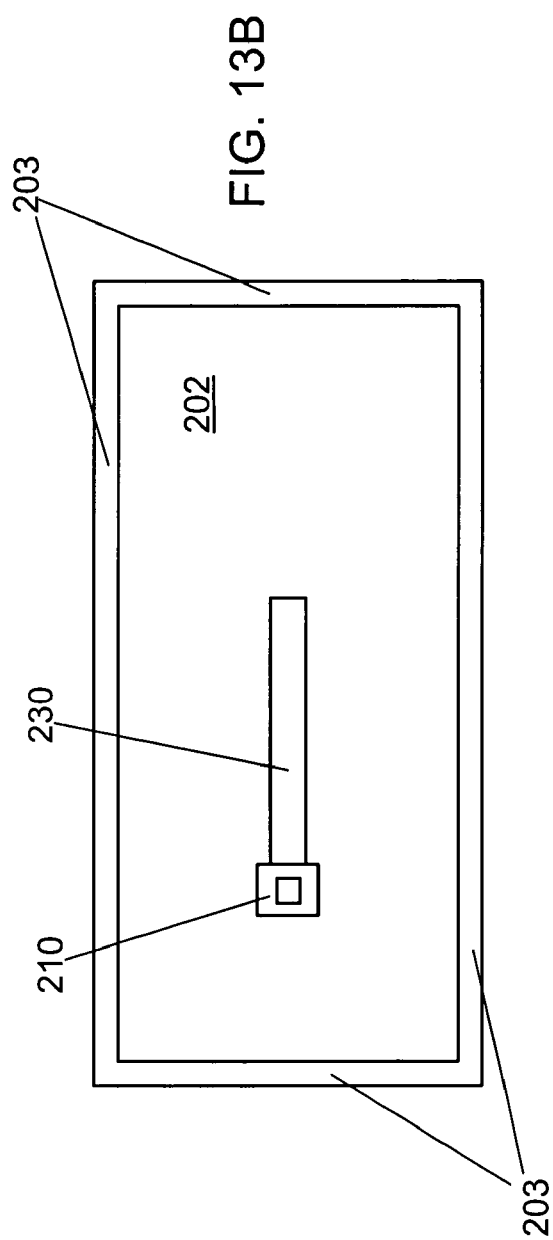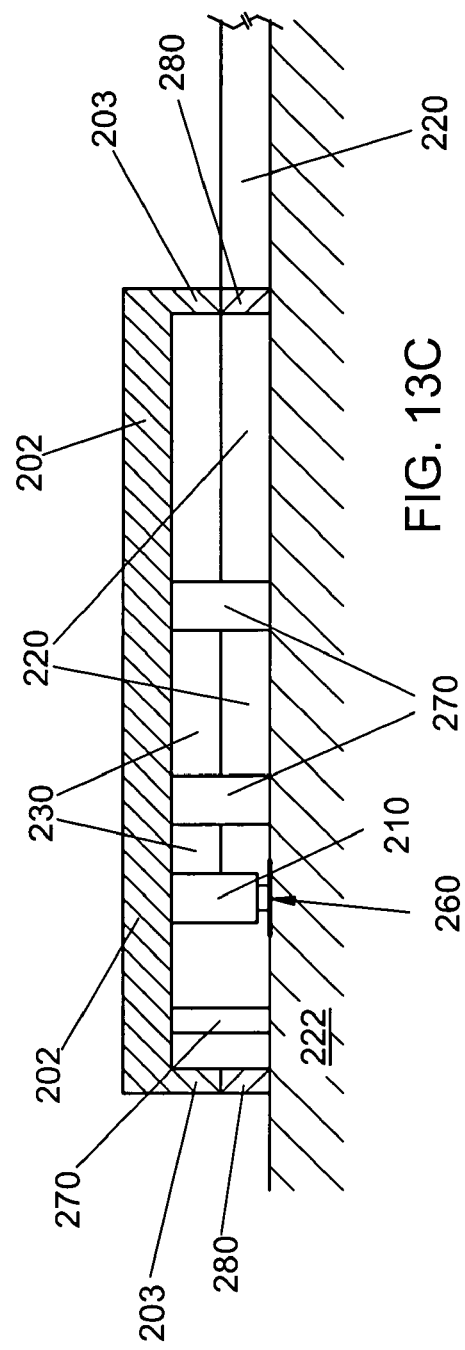

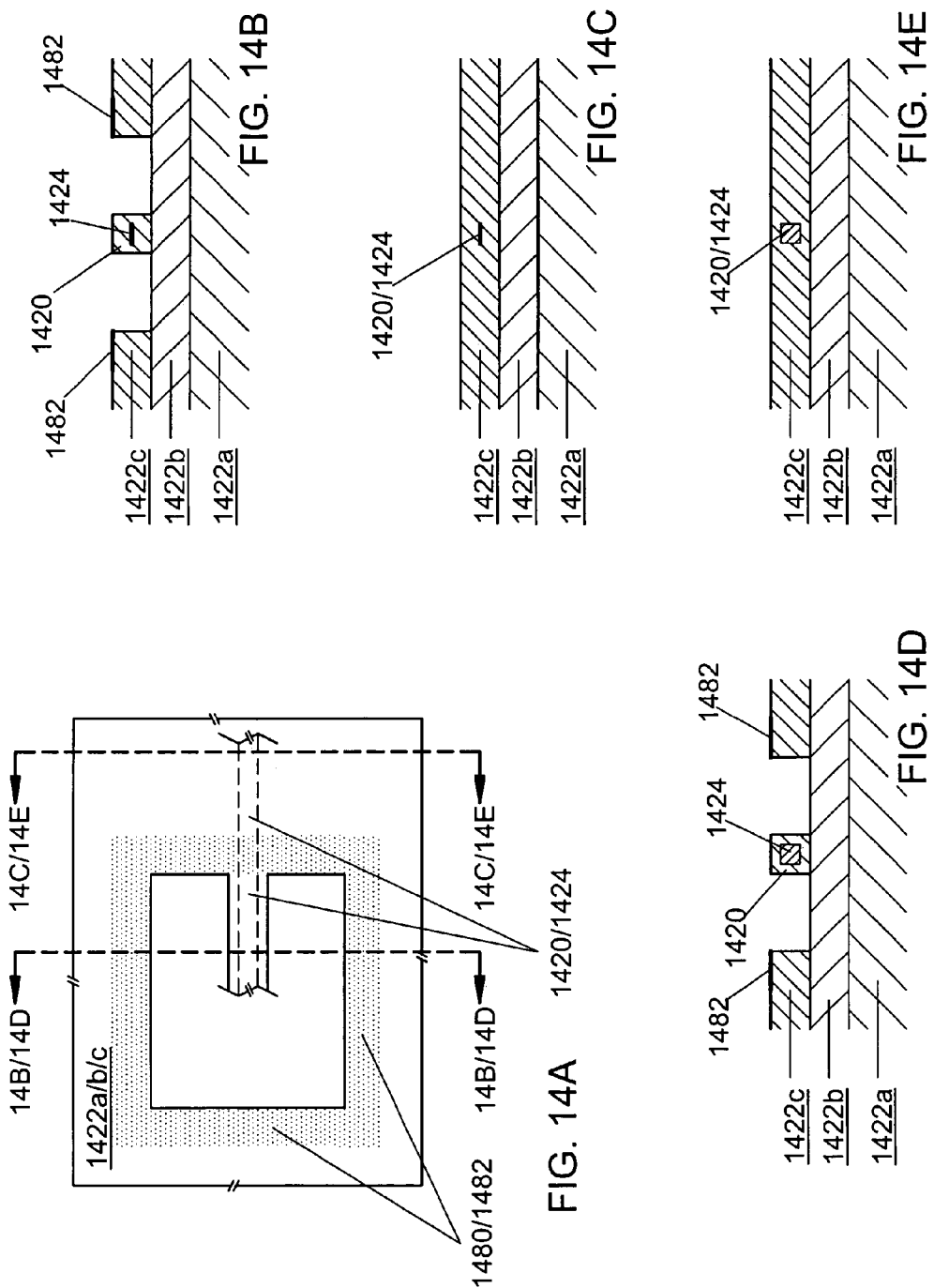

MICRO-HERMETIC PACKAGING OF OPTICAL DEVICES

RELATED APPLICATIONS

This application claims benefit of the following U.S. provisional patent applications:

App. No. 60/393,974 entitled "Micro-hermetic packaging of optical devices" filed Jul. 5, 2002 in the names of Albert M. Benzoni, Henry A. Blauvelt, David W. Vernooy, and Joel S. Paslaski, said provisional application being hereby incorporated by reference as if fully set forth herein;

App. No. 60/466,799 entitled "Low-profile-core and thin-core optical waveguides and methods of fabrication and use thereof" filed Apr. 29, 2003 in the names of David W. Vernooy, Joel S. Paslaski, and Guido Hunziker, said provisional application being hereby incorporated by reference as if fully set forth herein; and App. No. 60/473,699 entitled "Surface-mounted photodiode for an optical waveguide" filed May 27, 2003 in the names of Henry A. Blauvelt, David W. Vernooy, and Joel S. Paslaski, said provisional application being hereby incorporated by reference as if fully set forth herein.

BACKGROUND

The field of the present invention relates to optical telecommunication devices. In particular, apparatus and methods are described herein for micro-hermetic packaging of optical devices.

This application is related to subject matter disclosed in:

U.S. non-provisional App. Ser. No. 10/187,030 entitled "Optical junction apparatus and methods employing optical power transverse-transfer" filed Jun. 28, 2002 in the names of Henry A. Blauvelt, Kerry J. Vahala, David W. Vernooy, and Joel S. Paslaski, said application being hereby incorporated by reference as if fully set forth herein;

U.S. provisional App. No. 60/360,261 entitled "Alignment-insensitive optical junction apparatus and methods employing adiabatic optical power transfer" filed Feb. 27, 2002 in the names of Henry A. Blauvelt, Kerry J. Vahala, David W. Vernooy, and Joel S. Paslaski; and U.S. provisional App. No. 60/334,705 entitled "Integrated end-coupled transverse-optical-coupling apparatus and methods" filed Oct. 30, 2001 in the names of Henry A. Blauvelt, Kerry J. Vahala, Peter C. Sercel, Oskar J. Painter, and Guido Hunziker.

Many types of optical devices are deployed in many different use environments for implementing an optical telecommunications system. The proper functioning and performance of these active and passive devices generally depend on isolating the devices from an uncontrolled use environment that might otherwise degrade the device and/or its performance and functioning. Devices are therefore hermetically packaged to reduce or eliminate the influence of an uncontrolled use environment on the device. Examples of active optical devices may include but are not limited to semiconductor lasers, electro-absorption modulators, electro-absorption modulated lasers, electro-optic modulators, semiconductor optical amplifiers, photodiodes and other photodetectors, N×N optical switches, and so forth. Examples of passive devices may include but are not limited to wavelength division multiplexers/de-multiplexers, wavelength division slicers/interleavers, wavelength division add/drop filters, other optical filters, splitters/combiners, interferometers, phase shifters, dispersion compensators, fixed or variable optical attenuators, and so forth. Use of such optical devices involves transferring optical power or optical signal between the device (within its package) and a transmission waveguide (part of the optical telecommunications system, often an optical fiber or other low-loss optical waveguide).

Conventional hermetic packaging for such optical devices is typically bulky and expensive to implement. Devices are typically packaged one-by-one only after fabrication, assembly, and testing/characterization of the individual devices. The package itself, including necessary optical and/or electrical feed-throughs, is often far more voluminous than the device itself (and the sensitive surfaces thereof that necessitate the hermetic package in the first place), the large packaged volume generally being forced by the nature of the packaging processes. Constraints imposed by the packaging process and/or materials often require compromises to be made in the optical design and/or configuration of the device, perhaps satisfying material compatibility and/or tolerance/stability requirements at the expense of optical device performance, for example. The packaging process is generally labor intensive, typically involving separate steps for positioning the device, establishing optical and electrical connections, and then sealing the package.

SUMMARY

A method for micro-hermetic packaging of an optical device comprises: a) forming a micro-hermetic cavity on a substrate; b) providing a transmission optical waveguide on the substrate for enabling transfer of optical power between the interior and the exterior of the micro-hermetic cavity; and c) sealing the optical device within the micro-hermetic cavity to form a micro-hermetic package. A lid or substrate separate from the first substrate may be employed for the sealing process, or the micro-hermetic cavity may be provided on the lid and sealed onto the first substrate. An optical device may be positioned within the cavity for optical power transfer with the optical waveguide, and sealed within the micro-hermetic cavity. The device may alternatively be provided on the lid. The micro-hermetic cavity may be fabricated of a size comparable to the optical device, and many such cavities may be simultaneously fabricated on a single substrate using wafer-scale processing. The transmission optical waveguide provides an optical feed-through, and may be provided with the micro-hermetic cavity on the same substrate, or may be provided as a separate component and/or on a separate lid or substrate. Electrical feed-throughs may be provided on the substrate with the micro-hermetic cavity, as a separate component, on a lid, and/or on a separate substrate. Additional functionality for monitoring/controlling the optical device may be provided on the substrate with the micro-hermetic cavity, and/or on a lid or separate substrate.

An embedding or encapsulating medium may be employed for securing optical assemblies and protecting various optical surfaces thereof. Such embedding may serve as a micro-hermetic package and/or may also serve to enhance optical properties/performance of the packaged optical device.

Objects and advantages of micro-hermetic packaging apparatus and methods, as disclosed and/or claimed herein, may become apparent upon referring to the disclosed exemplary embodiments as illustrated in the drawings and disclosed in the following written description and/or claims.

BRIEF DESCRIPTION OF THE DRAWINGS

FIG. 1A is a top view of an planar waveguide substrate with a ring for micro-hermetic packaging.

FIG. 1B is a top view of an optical device on a device substrate.

FIGS. 7A–7K illustrate exemplary process steps for forming a micro-hermetic package.

FIGS. 8A–8H illustrate exemplary process steps for forming a micro-hermetic package.

FIG. 13B is a top view of an optical device on a device substrate with a ring for micro-hermetic sealing.

FIG. 13C is a side cross-section view of the device of FIG. 13B assembled onto the substrate of FIG. 13A.

FIGS. 14A–14E illustrate exemplary embodiments of an optical waveguide and micro-hermetic package.

Figure 1C:
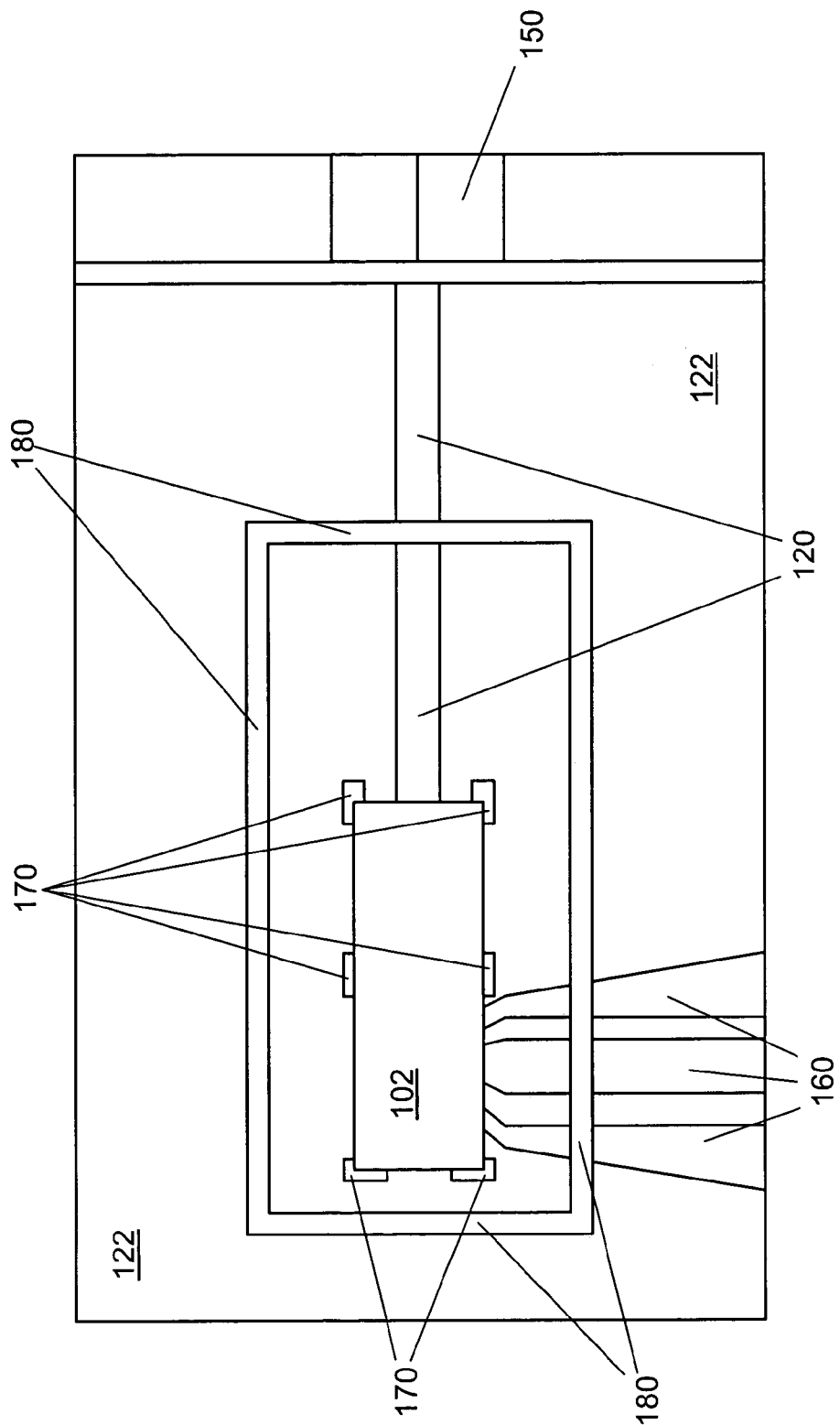
FIG. 1C is a top view of the device of FIG. 1B assembled onto the substrate of FIG. 1A.
Figure 1D:
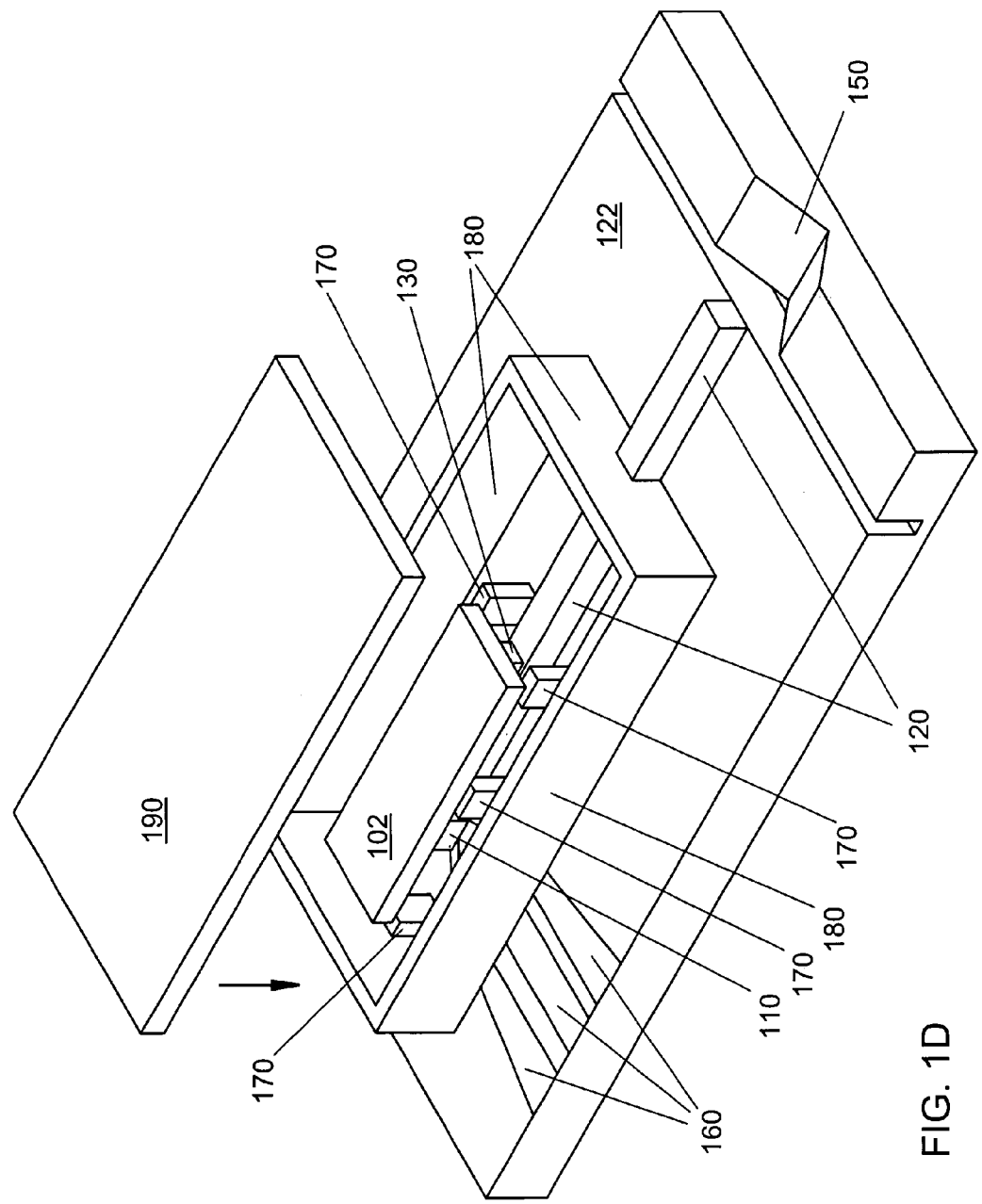
FIG. 1D is an isometric view of the assembled device of FIG. 1C with a lid for micro-hermetic packaging.

The embodiments shown in the Figures are exemplary, and should not be construed as limiting the scope of the present disclosure and/or appended claims. It should be noted that the relative sizes and/or proportions of structures shown in the Figures may in some instances be distorted to facilitate illustration of the disclosed embodiments.

DETAILED DESCRIPTION OF EMBODIMENTS

FIGS. 1A–1D illustrate micro-hermetic packaging of an exemplary optical device. The exemplary optical device shown may be fabricated and assembled as disclosed in earlier-cited Application Ser. No. 10/187,030, App. No. 60/360,261, and App. No. 60/334,705. Alternatively, the apparatus and methods disclosed herein may be applied to optical device assemblies of any suitable configuration. An optical device 110 and integral external-transfer optical waveguide 130 are provided on device substrate 102, and substrate 102 is then assembled onto a substantially planar waveguide substrate 122, substrate 122 having fabricated thereon a planar transmission optical waveguide 120 which may include a core (not shown). Also fabricated on substrate 122 are contacts/electrodes 160 and alignment/support structures 170. A proximal end of waveguide 120 is adapted for transverse-transfer of optical power (adiabatic or mode-interference-coupled) with the external-transfer optical waveguide 130 on substrate 102, which is "flip-chip" mounted onto waveguide substrate 122. A distal end of waveguide 120 may be adapted for substantially adiabatic mode-expansion (through tapering of the core, for example) and end-transfer of optical power to an end of a single-mode optical fiber (not-shown; may be received in groove 150). Alternatively, waveguide 120 may be otherwise adapted for optical power transfer to another optical waveguide or device in any suitable manner (including end-transfer and/or transverse-transfer), and/or may be one of multiple optical waveguides being provided on substrate 122 and comprising a portion of a more complex planar waveguide circuit (also referred to as a planar lightwave circuit, or PLC) on waveguide substrate 122.

An electrically insulating packaging or sealing ring 180 is preferably fabricated onto waveguide substrate 122 along with waveguide 120 and groove 150 (if present). Ring 180 serves to form a micro-hermetic cavity on substrate 122. Electrical contacts/electrodes may extend beneath ring 180 to provide electrical feed-throughs to the device 110 after hermetic sealing. Planar transmission optical waveguide 120 may pass through ring 180 to form an optical feed-through to device 110 after hermetic sealing. The upper surface of ring 180 may be provided with a thin metal coating (that may be wetted by molten solder) and lid 190 may be soldered onto ring 180, thereby hermetically sealing optical device 110, external-transfer optical waveguide 130, and the proximal portion of planar transmission optical waveguide 120 within the micro-hermetic cavity formed by waveguide substrate 122, ring 180, and lid 190. If sealed by soldering, the underside of the lid may preferably be provided with a thin metal coating (that may be wetted by solder) for soldering on at least the area of the underside corresponding to the top surface of ring 180, while an interior portion of the lid (corresponding to the micro-hermetic cavity) may preferably be masked or otherwise prevented from being wetted by solder. The upper surface of ring 180 should preferably be substantially planarized to facilitate sealing, although a solder re-flow process may form a seal over surfaces with small height variations.

Lid 190 may be metal, dielectric, ceramics (including multi-layer ceramics), semiconductor, combinations thereof (including multi-layered materials), and/or functional equivalents thereof. The underside of lid 190 may be provided with one or more recessed portions and/or relief cuts for accommodating structures within the hermetically sealed cavity that might extend as high as or higher than ring 180. Lid 190 may in fact be provided with a sealing ring (not shown), in addition to or instead of a sealing ring 180 on substrate 122. In the case that sealing rings are provided on both lid 190 and substrate 122, the rings should preferably mate to form a single micro-hermetic cavity. In addition to soldering, lid 190 may be sealed onto ring 180 in any suitable way, including but not limited to: soldering, welding (using a CO2 laser or otherwise), adhesives, wafer-bonding and/or similar techniques, thermal compression bonding, solder-glass bonding, combinations thereof, and/or functional equivalents thereof.

Sensitive optical surfaces of optical device 110, external-transfer optical waveguide 130, and the proximal portion of planar transmission optical waveguide 120 are protected from contamination and/or corrosion due to humidity and/or the presence of contaminants, which may typically arise through exposure to an uncontrolled use environment. This is of particular importance for maintaining desired levels of transverse-transfer of optical power between external-transfer optical waveguide and planar transmission optical waveguide 120. Such transverse-transfer of optical power can be sensitive to contamination of the waveguide surfaces involved. Hermetic sealing may also serve to: protect semiconductor surfaces and/or facets; to protect metal-coated areas such as electrical conductors, electrodes, contacts, feed-throughs, and/or optical coatings; to inhibit or prevent galvanic corrosion; to inhibit or prevent ionic migration; to enhance thermal stability of the sealed device. It should be noted that micro-hermetic packaging methods and apparatus as disclosed herein are not limited to packaging of devices employing transverse-transfer of optical power, or devices assembled onto the substrate as shown in FIGS. 1A–1D. Any optical devices and/or waveguides employing optical power transfer by transverse-transfer and/or end–transfer may be hermetically packaged according to the present disclosure. Any optical devices and/or waveguides integrated or assembled onto a substrate and connected to an optical transmission system through one or more planar optical waveguides on the substrate may be hermetically packaged according to the present disclosure.

Ring 180 may be fabricated from any substantially electrically insulating material capable of providing an adequate barrier against moisture and/or contaminants. Insulating material is preferred for the exemplary configuration of FIGS. 1A–1D so as not to short out contacts/electrodes 160. If electrical feed-throughs are provided in some other way, non-insulating material(s) may also be used to fabricate ring 180. Materials and processes used for fabricating ring 180 should preferably be compatible with the precision material fabrication/processing techniques used to fabricate planar transmission optical waveguide 120 and other associated structures that might be present (i.e., contacts/electrodes 160, alignment/support structures 170, other optical waveguides, integrated optical devices, and so on) on substrate 122. These techniques may include but are not limited to: lithography, etching, deposition, masking, doping, spin coating, and so forth. Employing such techniques not only enables precision positioning of ring 180 with respect to waveguides 120 and 130, device 110, and other associated structures, but also enables fabrication and precision positioning of many (hundreds or thousands) of planar transmission optical waveguides 120 and corresponding rings 180 and other associated structures simultaneously on a single substrate or wafer, which may be subsequently divided to form finished optical apparatus. The practical advantages and economies of scale of such wafer-scale fabrication and/or processing are well known. Suitable materials for ring 180 may include silica, silica-based materials, polymers including polyimide, ceramics, semiconductors, metals, combinations thereof, and/or functional equivalents thereof satisfying the above-stated mechanical, chemical, dielectric, and/or fabrication requirements.

The description of the sides of the micro-hermetic package as a "ring" may be generalized to include a package in which portions of the substrate outside the ring are at the same height as the ring (see FIGS. 14A–14C and 15A–15C). Instead of a micro-hermetic cavity formed within a protruding ring, the micro-hermetic cavity is formed within a depression or recess in an otherwise substantially flat substrate. Such an embodiment may offer advantages and/or economies of fabrication and/or assembly, particularly since a larger area may be available for sealing a lid over the micro-hermetic cavity. Throughout the present disclosure, whenever a "ring" is referred to for forming a micro-hermetic cavity, such a cavity may equivalently be formed instead as a cavity or recess, or the micro-hermetic cavity may be formed by a combination of a recessed portion of a substrate surrounded by a protruding ring.

An optical device and associated waveguides, contacts, and so forth packaged according to the present disclosure may be significantly less voluminous than optical devices packaged by previous techniques, and may typically require substantially fewer parts. An optical device in a micro-hermetic package according to the present disclosure may nevertheless be placed within a secondary package that outwardly resembles previous device packages. Such a secondary package need not be hermetically sealed and may therefore be provided much more economically than previous hermetic packages, but would provide mechanical compatibility with existing optical transmission systems and equipment. In other words, devices packaged according to the present disclosure (and then enclosed within an appropriate secondary package) could be readily interchanged with existing devices packaged according to previous hermetic packaging techniques. However, the significantly reduced packaged volume of an optical device packaged according to the present disclosure may be exploited for reducing the overall size of next-generation optical transmission systems and/or equipment by using the micro-hermetic-packaged devices without secondary packaging.

The intersection of planar transmission optical waveguide 120 and ring 180 warrants further consideration. The presence of ring 180 around waveguide 120 may disrupt transmission of optical power through waveguide 120 if not properly designed. One simple means for reducing any such disruption is to provide waveguide 120 with sufficiently thick cladding around core 124 at the point where waveguide 120 passes through ring 180. Such thick cladding may also be desirable for the portion of waveguide 120 that extends outside ring 180 (i.e., outside the hermetic cavity). However, for transverse-transfer of optical power between waveguide 120 and the external-transfer waveguide 130, core 124 may typically be fairly close to the surface of waveguide 120. FIGS. 2A–2B, 3A–3B, and 4A–4B illustrate various configurations and fabrication processes for introducing thicker cladding for waveguide. 120 at ring 180 and outside ring 180, while leaving thinner cladding inside ring 180 for enabling transverse-transfer. The thicker cladding should preferably be introduced sufficiently gradually that its appearance does not substantially interfere with transmission of optical power through waveguide 120 (i.e., adiabatic condition substantially satisfied, as defined in earlier-cited Application Nos. 10/187,030 and 60/360,261).

Figure 2A:
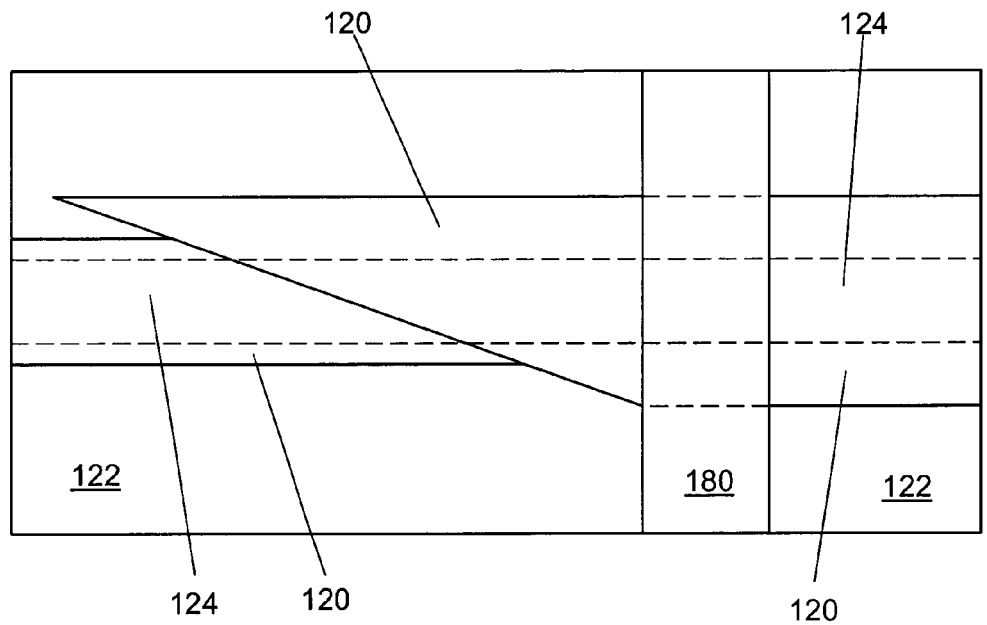
FIGS. 2A–2B are top and side views, respectively, of an exemplary optical waveguide and a portion of a micro-hermetic package.
Figure 2B:
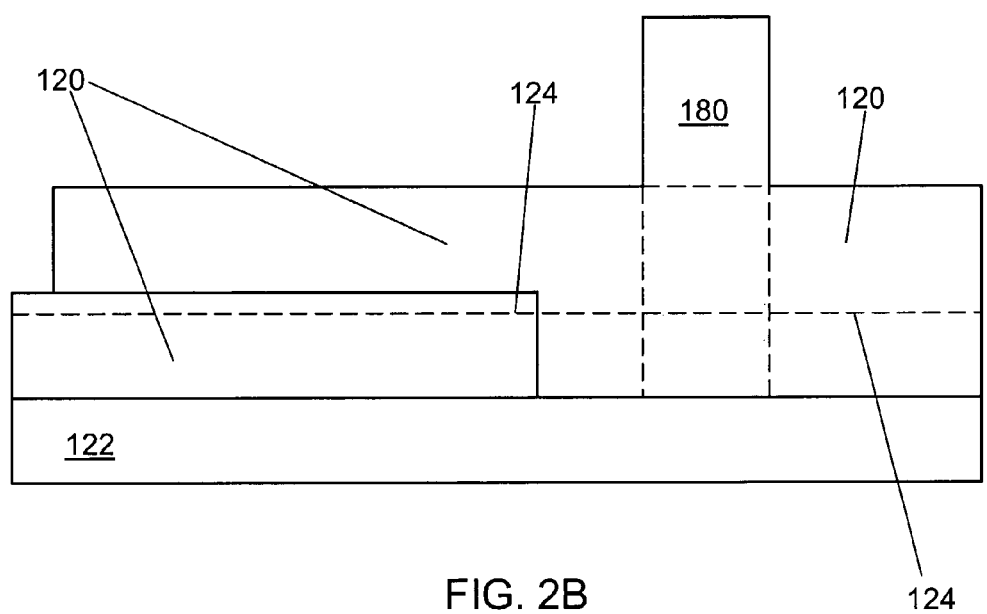

In FIGS. 2A–2B, an upper cladding layer of substantially uniform thickness is deposited on waveguide 120 (exemplary overall waveguide dimensions are several $\mu$m wide and several $\mu$m thick) and core 124 (exemplary dimensions are several $\mu$m wide and several tens of nm thick, beneath about 0.5 $\mu$m of cladding). Exemplary core and cladding materials are silicon nitride and germanium-doped silica, respectively, although many other core/cladding material combinations and/or dimensions may be equivalently employed (including cores having a lower aspect ratio). The upper cladding layer is preferably sufficiently thick so that an evanescent portion (extending above the cladding) of any optical power propagating through the waveguide negligibly affects the level of optical power transmission through the waveguide (i.e., any decrease in optical power transmission is within operationally acceptable limits, whatever those may be for the given circumstances). Spatially-selective masking/deposition/etching (and/or other suitable spatially-selective material processing techniques) may be employed to provide an obliquely beveled lateral surface for this layer, which cuts across waveguide 120 at a shallow angle within ring 180. The thicker cladding therefore gradually appears along a portion of the length of waveguide 120 without substantially disturbing transmission of optical power therethrough (substantially adiabatic, within operationally acceptable limits). The thick upper cladding layer thus deposited may substantially confine transmitted optical power sufficiently far from the surface of waveguide 120 so that ring 180 and environmental factors outside ring 180 only affect optical power transmission within operationally acceptable limits. The waveguide 120 and the thick upper cladding layer may be fabricated in a process separate from fabrication of ring 180, or may occur concurrently with fabrication of ring 180. In the latter case, ring 180 and the thick upper cladding layer may in fact form parts of a contiguous structure. The thick upper cladding should preferably extend no farther vertically than the height of ring 180 (at least at the point of intersection of waveguide 120 and ring 180), so that lid 190 may properly form a seal with ring 180.

Figure 3A:
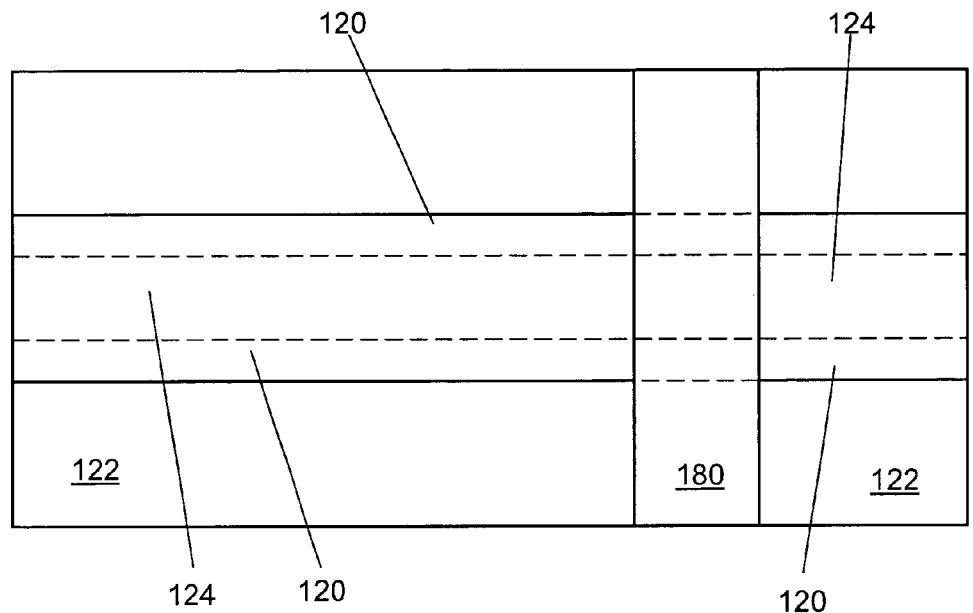
FIGS. 3A–3B are top and side views, respectively, of an exemplary optical waveguide and a portion of a micro-hermetic package.
Figure 3B:
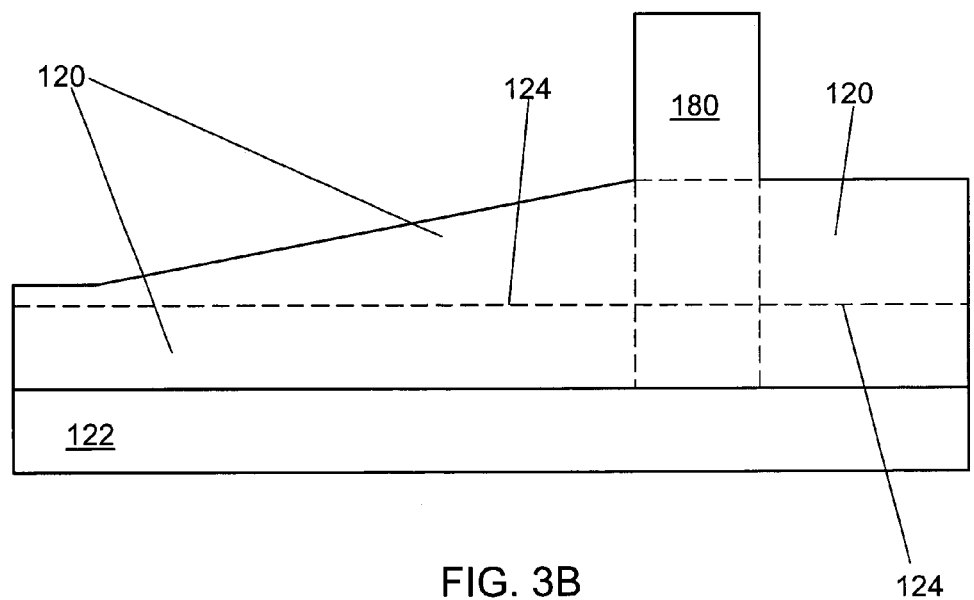

In FIGS. 3A–3B, an upper cladding layer of increasing thickness is deposited on waveguide 120 and core 124 (materials and dimensions similar to the previous example; other material combinations and/or dimensions may be equivalently employed). The upper cladding is preferably sufficiently thick (where the waveguide 120 passes through the ring 180) to maintain any resulting decrease in optical power transmission within operationally acceptable limits. Spatially-selective masking/deposition/etching (and/or other suitable spatially-selective material processing techniques) may be employed to provide an upper cladding layer of gradually increasing thickness (i.e., vertically tapered) with increasing distance from the proximal end of waveguide 120 within ring 180. The vertically tapered upper cladding layer may be fabricated in a sequence including multiple deposition steps, may be fabricated using grayscale lithography techniques, or may be fabricated by any other suitable processing sequence. The thicker cladding gradually appears along a portion of the length of waveguide 120 without substantially disturbing transmission of optical power therethrough (substantially adiabatic, within operationally acceptable limits). The thick upper cladding layer thus deposited may substantially confine transmitted optical power sufficiently far from the surface of waveguide 120 so that ring 180 and environmental factors outside ring 180 only affect optical power transmission within operationally acceptable limits. The waveguide 120 and the thick upper cladding layer may be fabricated in a process separate from fabrication of ring 180, or may occur concurrently with fabrication of ring 180. In the latter case, ring 180 and the thick upper cladding layer may in fact form parts of a contiguous structure. The thick upper cladding should preferably extend no farther vertically than the height of ring 180 (at least at the point of intersection of waveguide 120 and ring 180), so that lid 190 may properly form a seal with ring 180.

Figure 4A:
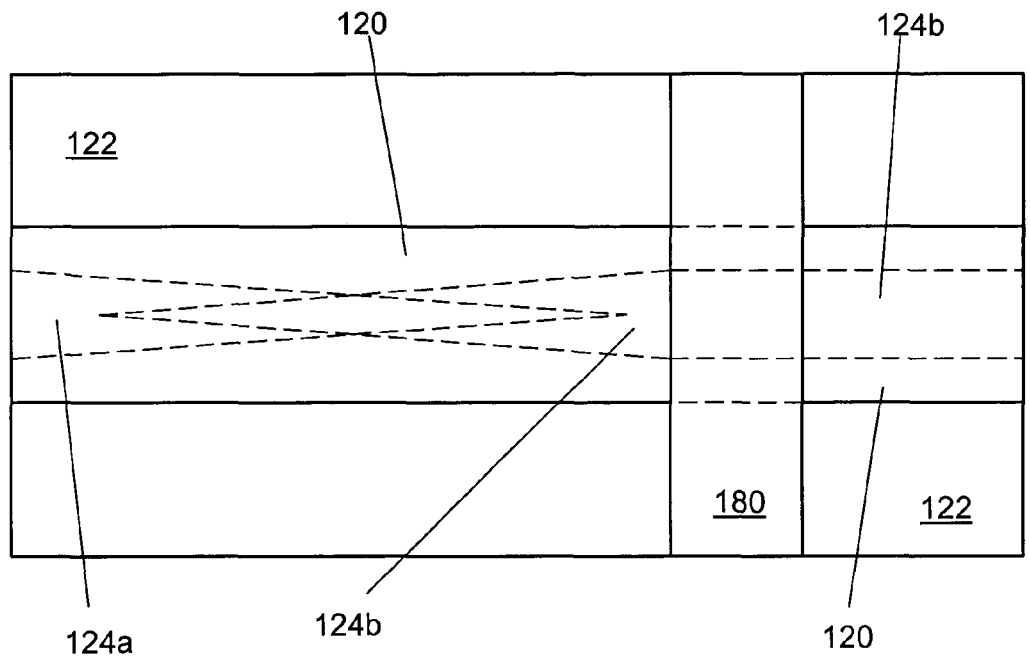
FIGS. 4A–4B are top and side views, respectively, of an exemplary optical waveguide and a portion of a micro-hermetic package.
Figure 4B:
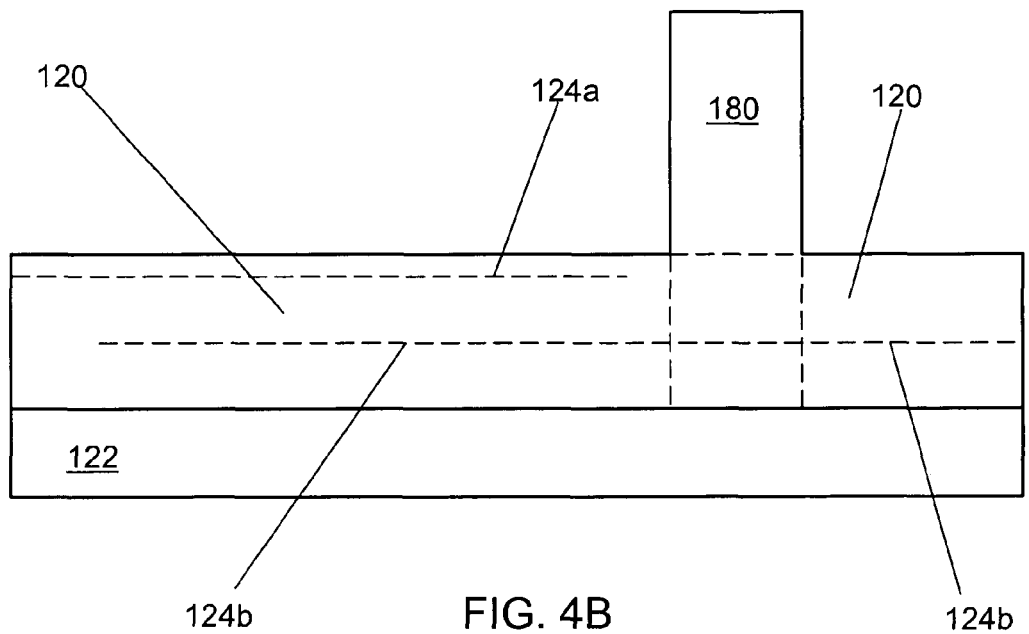

In FIGS. 4A–4B, waveguide 120 is fabricated with two cores 124a and 124b. Materials and dimensions may be similar to the previous examples; other material combinations and/or dimensions may be equivalently employed. Core 124a is provided near the top of waveguide 120 (beneath about 0.5 $\mu$m of cladding) at the proximal end of waveguide 120. Core 124b is provided deeper within waveguide 120 (beneath several $\mu$m of cladding; same overall waveguide thickness) at the distal end thereof. Waveguides 124a and 124b are adapted for transverse-transfer of optical power therebetween (adiabatic or mode-interference-coupled; adiabatic shown in FIGS. 4A–4B) within an intermediate portion of waveguide 120 within ring 180. In this way transmitted optical power may be substantially confined sufficiently far from the surface of waveguide 120 so that ring 180 and environmental factors outside ring 180 only affect optical power transmission within operationally acceptable limits. The waveguide 120 may be fabricated in a process separate from fabrication of ring 180, or may occur concurrently with fabrication of ring 180. In the latter case, ring 180 and the thick upper cladding layer may in fact form parts of a contiguous structure.

Figure 5:
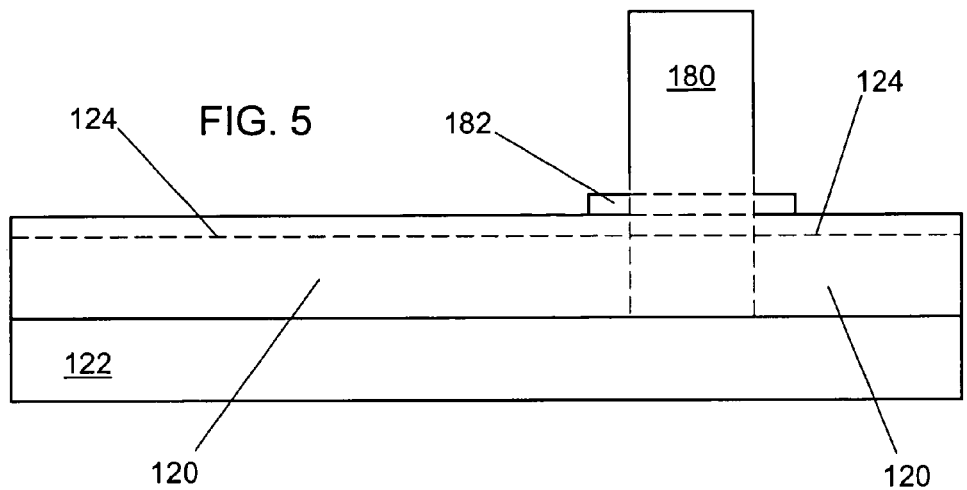
FIG. 5 is a side view of an exemplary optical waveguide and a portion of a micro-hermetic package.
Figure 6H:
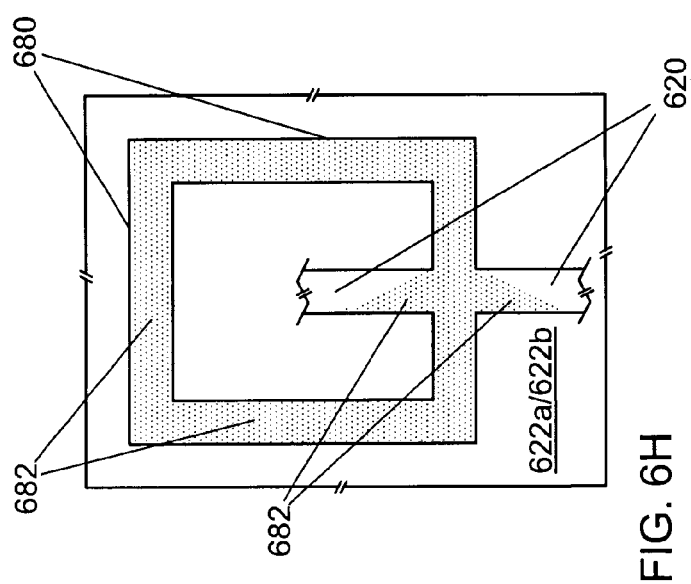

In some instances it may be possible to avoid the structures and procedures described in the preceding paragraphs. For example, if transverse-transfer of optical power is not employed by any of the optical components or waveguides within ring 180 and therefore none of the waveguides has a thin-clad portion, then the ring may be fabricated over waveguide 120 without substantially disturbing transmission through the waveguide. Alternatively, the walls of ring 180 may be sufficiently thin (compared to the transverse spatial mode size characteristic of waveguide 120) that transmission of optical power through waveguide 120 will be sufficiently undisturbed even without a thicker upper cladding layer. In this instance ring 180 may be fabricated over waveguide 120, and any optical loss thereby induced simply tolerated (if within operationally acceptable limits). Alternatively, a reflective coating 182 (a thin metal reflector coating or a multi-layer dielectric reflector coating) may be deposited on the short segment of waveguide that will be covered by ring 180 (FIG. 5). This may sufficiently reduce disruption by ring 180 of optical power transmission through waveguide 120. Such a coating may only be present between ring 180 and waveguide 120, or may appear and disappear substantially adiabatically along the length of waveguide 120 (see FIG. 6H, for example).

The particular waveguide type and material(s) employed for the transmission waveguide and material(s) employed for the sealing ring may require specifically tailored fabrication and/or processing sequences. A variety of examples of such sequences are disclosed herein for particular materials and waveguide types, but should not be construed as limiting the scope of inventive concepts disclosed and/or claimed herein. It should be pointed out that in many instances where uniform layer deposition followed by spatially-selective material removal is employed for providing a structure, that structure may often be equivalently provided by spatially-selective deposition.

Figure 6G:
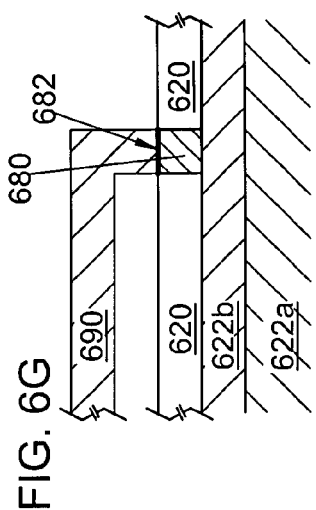

In the exemplary process sequence illustrated in FIGS. 6A–6F, a substantially planar waveguide substrate (FIGS. 6A and 6D), including a substrate layer 622a, an optical buffer layer 622b, and a waveguide material layer 622c, is processed to spatially-selectively remove at least a portion of the waveguide material layer (and perhaps also a portion of the buffer layer), leaving ring 680 and waveguide 620 (FIGS. 6B and 6E), the waveguide 620 in this example being an air-guided ridge waveguide. In this example layer 622a may be silicon, layer 622b may be substantially un-doped silica, and layer 622c may be germanium-doped silica having a higher index than layer 622b. Any other suitable materials or material combinations may be employed, provided buffer layer 622b has a lower index than layer 622c. Alternatively, if substrate layer 622a has a lower index than layer 622c, then buffer layer 622b could potentially be omitted. The interior portion of waveguide 620 (i.e., the portion within the ring 680) may be adapted in any suitable manner for interacting with other waveguides, optical components, and/or optical devices within ring 680. Similarly, the exterior portion of waveguide 620 may be adapted in any suitable manner for interacting with other waveguides, optical components, and/or optical devices. The upper surface of ring 680 may be provided with a thin metal coating 682 for allowing soldering of a lid (FIGS. 6C and 6F), or may be otherwise adapted for sealing a lid. As shown in the cross-section of FIG. 6G, the underside of lid 690 may be provided with a recessed central portion to eliminate contact with the top surface of waveguide 620. To further reduce the effect of the metal coating 682 on optical power transmission through waveguide 620, the metal coating 682 may extend along waveguide 620 (in either or both directions from the waveguide/ring intersection), and may be configured to gradually appear along a portion of the length of waveguide 620. For example, in FIG. 6H the edge of the metal coating 682 is shown cutting across waveguide 620 at an oblique angle, thereby maintaining a substantially adiabatic condition along waveguide 620. Other configurations for introducing metal coating 682 while maintaining substantially adiabatic conditions or otherwise reducing the impact of the metal coating on optical power transmission may be implemented while remaining within the scope of inventive concepts disclosed and/or claimed herein.

Figure 7K:
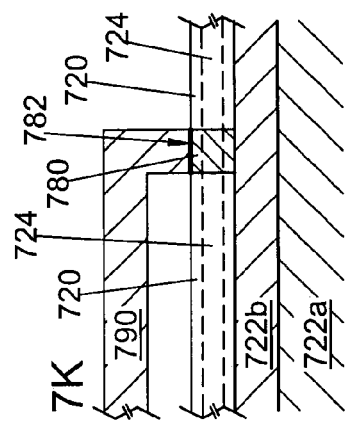
Figure 7J:
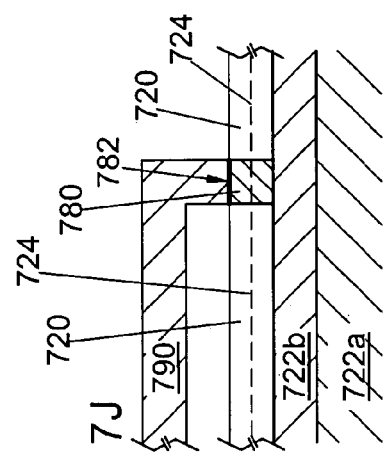

The exemplary process illustrated in FIGS. 7A–7I may be employed for providing a waveguide comprising a core and lower-index cladding, in which the core does not substantially disturb the flatness of the upper surface of the waveguide. Starting with the material layers 722*a* (substrate), 722*b* (buffer), and 722*c* (cladding) analogous to those of FIGS. 6A and 6D, a core 724 may be provided by: spatially-selectively providing a thin-film core (FIG. 7D) having a thickness of only several tens of nm, using silicon nitride or silicon oxynitride in this example, or equivalently employing any suitable thin-film core material; spatially-selectively increasing the refractive index of the waveguide to form a core (FIG. 7G), by irradiative densification, dopant diffusion or implantation, photochemical alteration, and/or photophysical alteration. Once the waveguide core 724 has been thus defined, additional cladding material may be added, thereby increasing the thickness of layer 722*c* and embedding core 724 therein (FIGS. 7E and 7H). The substrate 722 is then processed to spatially-selectively remove a least a portion of cladding layer 722*c* (and perhaps also a portion of buffer layer 722*b*), leaving ring 780 and waveguide 720 (FIGS. 7B, 7F, and 7I). The upper surface of ring 780 may be provided with a metal coating 782 for allowing soldering of a lid (FIG. 7C), or may be otherwise adapted for sealing a lid. The underside of lid 790 may be provided with a central recessed portion for eliminating contact with the upper surface of waveguide 720 (FIGS. 7J and 7K), although this may not be necessary if the upper cladding layer of waveguide 720 is sufficiently thick (as discussed hereinabove). The interior portion of waveguide 720 (i.e., the portion within the ring 780) may be adapted in any suitable manner for interacting with other waveguides, optical components, and/or optical devices within ring 780. Similarly, the exterior portion of waveguide 720 may be adapted in any suitable manner for interacting with other waveguides, optical components, and/or optical devices. The intersection of waveguide 720 and ring 780 may be configured in any suitable manner, including those shown in FIGS. 2A–2B, 3A–3B, and/or 4A–4B.

Figure 8H:
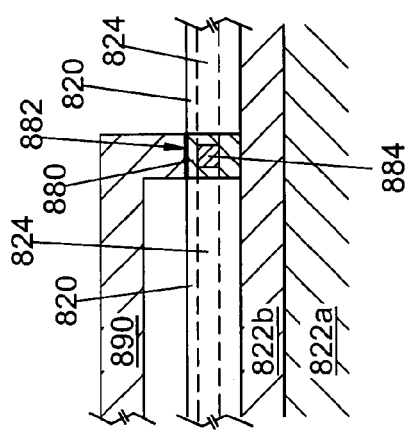

The exemplary process illustrated in FIGS. 8A–8F may be employed for providing a waveguide comprising a core and lower-index cladding, in which the core alters the shape of the upper surface of the waveguide. Starting with the material layers 822*a* (substrate), 822*b* (buffer), and 822*c* (cladding) analogous to those of FIGS. 6A and 6D, an additional core layer may be added, the core layer having an index higher than that of cladding layer 822*c*. If cladding layer 822*c* comprises germanium-doped silica, for example, the core layer might also comprise germanium-doped silica doped at a higher level than the cladding so that the core level index is larger than the cladding level index by an appropriate amount. Other substrate, buffer, cladding, and core material may be equivalently-employed. A waveguide core 824 may be provided by spatially-selective removal of at least a portion of the core layer, in this example leaving not only a waveguide core portion 824 but a ring core portion 884 (FIGS. 8A and 8D). Once the waveguide core 824 has been provided, additional cladding material may be added, thereby increasing the thickness of layer 822*c* and embedding core 824/884 therein (FIGS. 8B and 8E). However, since the deposition of additional cladding material is typically nearly conformal, the resulting surface will not be flat. The surface of the cladding material will have a protruding ridge shape corresponding to the shape of the underlying core, including a waveguide portion 820 and a sealing ring portion 880, and the upper surface of the ridge should be substantially flat and therefore able to serve as a sealing surface for a lid. A portion of the cladding material not lying below the ridges 820/880 may be spatially-selectively removed, if desired, and a metal coating 882 provided on the top surface of the ring portion of the ridge 880 to allow soldering of a lid, or may be otherwise adapted for sealing a lid (FIGS. 8C, 8F, and 8G). The underside of lid 890 may be provided with a central recessed portion for eliminating contact with the upper surface of waveguide 820 (FIG. 8H), although this may not be necessary if the upper cladding layer of waveguide 820 is sufficiently thick (see discussion hereinabove). The interior portion of waveguide 820 (i.e., the portion within the ring 880) may be adapted in any suitable manner for interacting with other waveguides, optical components, and/or optical devices within ring 880. Similarly, the exterior portion of waveguide 820 may be adapted in any suitable manner for interacting with other waveguides, optical components, or optical devices. The intersection of waveguide 820 and ring 880 may be configured in any suitable manner, including those shown in FIGS. 2A–2B, 3A–3B, and/or 4A–4B. The core 884 present within ring 880 will typically reduce transmission of optical power through waveguide 820 only minimally (since its width is typically similar to the transverse spatial mode size supported by core 824 of waveguide 820), provided waveguide 820 crosses ring 880 at a sufficiently large angle (greater than about 20°, preferably greater than about 45°, most preferably near 90°).

Figure 9A:
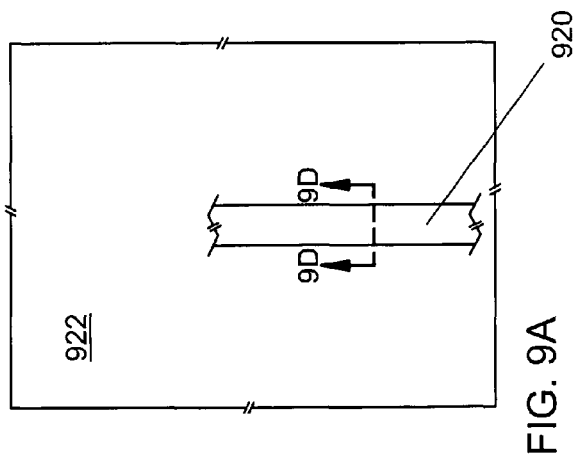
FIGS. 9A–9F illustrate exemplary process steps for forming a micro-hermetic package.
Figure 9D:
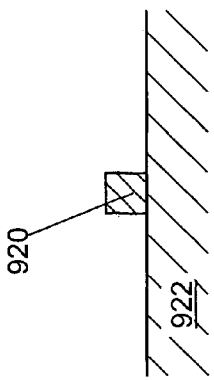
Figure 9B:
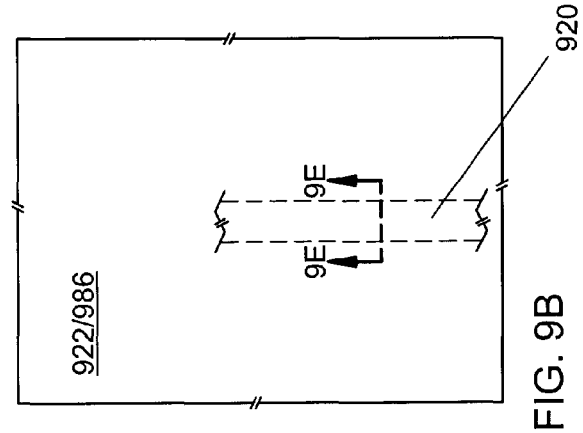
Figure 9E:
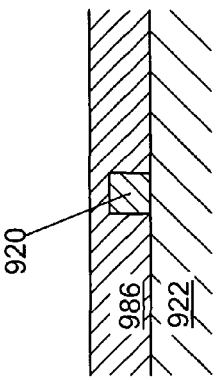
Figure 9C:
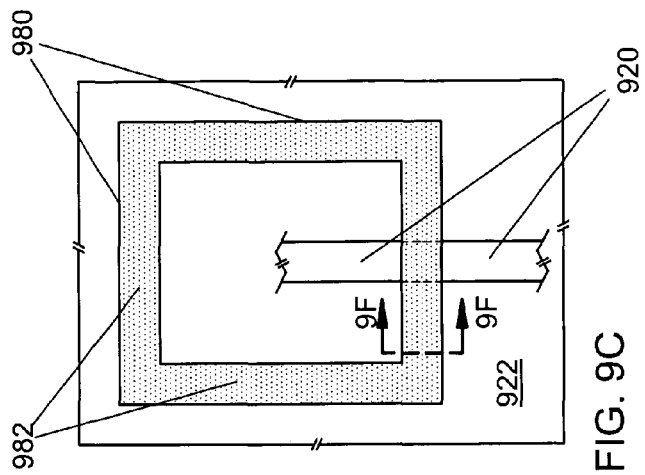
Figure 9F:
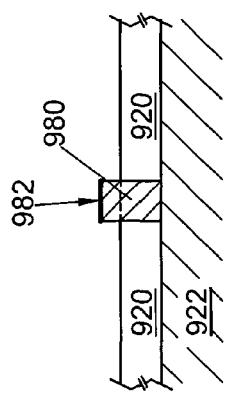

Some materials employed for fabricating a sealing ring may allow fabrication of a substantially flat-topped ring over underlying structures that are not necessarily flat, as in the exemplary process illustrated in FIGS. 9A–9F. A protruding ridge transmission waveguide 920 of any suitable type is provided by any suitable means on substrate 922 (FIGS. 9A and 9D). The substrate may then be spin-coated with a polymer layer 986 (FIGS. 9B and 9E). The nature of spin-coating and the polymer precursors results in a substantially flat upper surface of polymer layer 986, despite the presence of protruding structures beneath. Spatially-selective removal of at least a portion of polymer layer 986 leaves a sealing ring 980 with waveguide 920 therethrough (FIGS. 9C and 9F). The polymer ring 980 may be provided with a metal coating 982 for soldering a lid, or may be otherwise adapted for sealing a lid (FIGS. 9C and 9F). As in previous examples, the interior, exterior, and intersecting portions of waveguide 920 may be adapted in any suitable manner dictated by the requirements of the particular optical apparatus being constructed. A ring could be similarly provided using any other material that may be used to form a substantially flat layer over underlying protruding structures, by spin-coating, spray-coating, re-flow, or other suitable processes. Such materials may include but are not limited to polyimide, epoxies, CYTOP (Asahi Glass Company; a polyfluorinated polymeric material that may be cross-linked), silicone and silicone-based materials, spin-on glass materials, siloxane polymers, Cyclotene™ (B-staged bisbenzocyclobutene, Dow), Teflon® AF (DuPont), other polymers, sol-gel materials, doped silica-based materials, solder-glass, other glasses. Alternatively, many materials may deposited by a variety of techniques to provide a substantially flat upper surface if deposited in a sufficiently thick layer (substantially thicker than the underlying structures). A surface thus provided may be sufficiently flat for enabling subsequent sealing of a micro-hermetic cavity.

Figure 10:
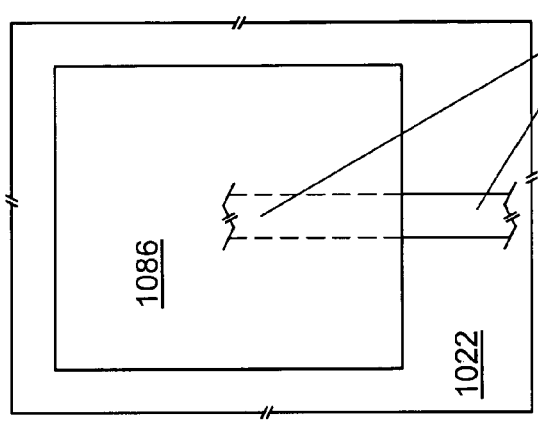
FIG. 10 is a top view of an exemplary optical waveguide and micro-hermetic package.

Instead of constructing a ring around the transmission waveguide and associated components and/or structures near the proximal end thereof (i.e., the end that eventually would end up within a sealing ring), it may be desirable to completely embed the transmission optical waveguide (or the proximal end thereof and the associated components and/or structures. For example, in the preceding example (FIGS. 9A–9F), instead of removing the polymer to form a ring, the polymer could have been simply left intact (or removed only from the distal end of the transmission waveguide 1020 on substrate 1022, as in FIG. 10). The embedding material 1086 serves to protect surfaces of the waveguide and other components and/or structures and maintain them in their properly-aligned operating positions. Preferably, the embedding material comprises transparent material (at the relevant wavelengths) having an index less than or about equal to the optical components embedded therein. In addition to providing protection, the presence of embedding material reduces the index contrast between the packaged optical device and/or optical waveguides and their surroundings, and may therefore also serve to reduce optical termination issues and/or improve the adiabatic nature of any embedded optical transmission components. The optical properties and/or performance of the packaged optical device and/or waveguides may therefore be enhanced by the presence of the embedding material. For example, optical transitions may appear to be more adiabatic and therefore less lossy, or a given level of adiabaticity may be maintained while reducing the lengths of transition regions. Such embedding, or "potting", of the transmission waveguide and other waveguides, optical devices, and/or optical components may be employed when all of the components are integrated together on the substrate, or may be employed after components are assembled onto the substrate (as in FIGS. 1A–1D, minus ring 180 and lid 190). Suitable materials for embedding waveguides and other optical devices/components may include but are not limited to the materials listed in the preceding paragraph. Embedding may performed for many devices simultaneously on a single substrate (wafer-scale), or alternatively may be performed for individual devices. Embedding may be non-selective (in which an optical device and all associated components, waveguides, and/or other structures are embedded together), or embedding may be selective or sectional, thereby requiring dams, grooves, trenches, or other similar structures for restricting or directing the flow of the embedding material (as described hereinabove).

Figure 15A:
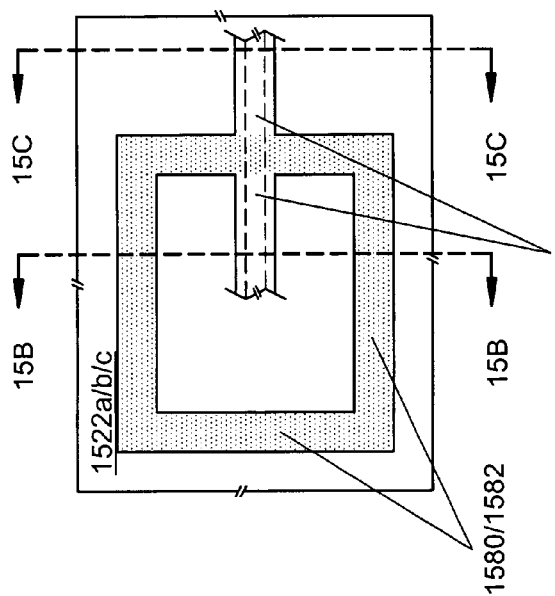
FIGS. 15A–15C illustrate an exemplary embodiment of an optical waveguide and micro-hermetic package.
Figure 15C:
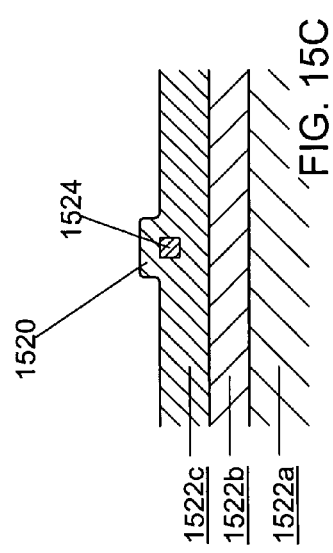
Figure 15B:
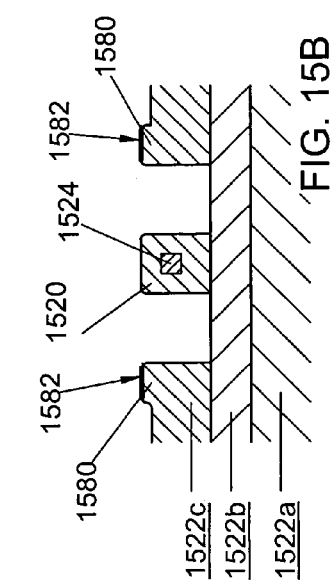

Methods and apparatus for micro-hermetic packaging of optical devices have been described herein primarily in terms of providing a sealing ring and a transmission waveguide as protruding structures on a substrate, the sealing ring forming the sides of a micro-hermetic cavity. However, other geometries may be equivalently employed for forming a micro-hermetic cavity while remaining within the scope of inventive concepts disclosed and/or claimed herein. For example, to form the exemplary embodiment of FIGS. 14A–14E, procedures analogous to those employed in FIGS. 7A–7I are employed. In the embodiment of FIGS. 14A–14E, however, material is only removed from the interior portion of the "ring" 1480, leaving a depression in the cladding layer 1422c. Transmission waveguide 1420 with core 1424 is a ridge waveguide within the micro-hermetic cavity, but is a buried waveguide outside the micro-hermetic cavity. A thin metal coating 1482 may be applied around the perimeter of the "ring" 1480 for enabling sealing of a lid. To form the embodiments of FIGS. 15A–15C, procedures analogous to those employed in FIGS. 8A–8G are employed. In the embodiment of FIGS. 15A–15C, however, cladding material 1522c is removed only from the interior of the "ring" 1580 to form a deep ridge waveguide 1520 with core 1524 within the micro-hermetic cavity. Core 1524 forms a shallow ridge waveguide 1520 outside the micro-hermetic cavity. Metal film 1582 enables sealing of a lid onto the top of ring 1580. In another alternative embodiment (not shown), a sealing ring may be fabricated as a protruding structure on a substantially flat surface in which the transmission waveguide is substantially completely embedded as a buried waveguide.

Figure 11:
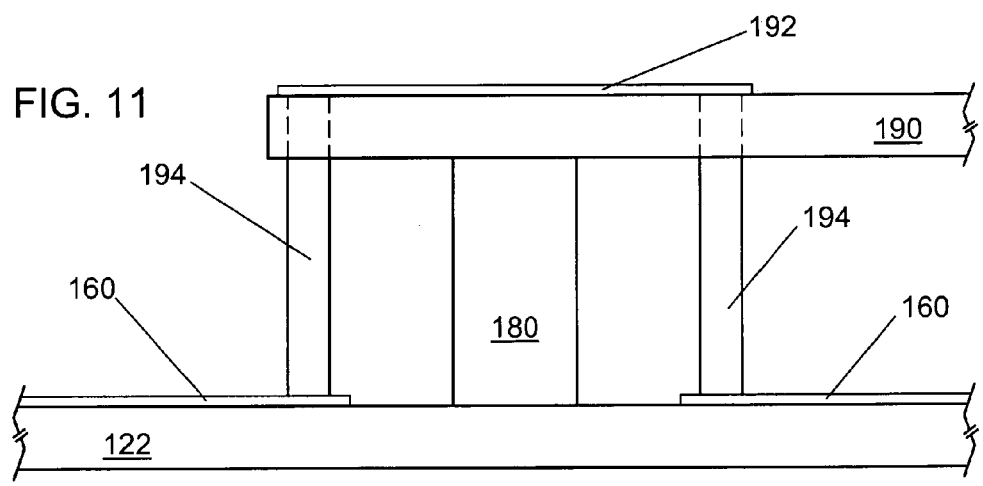
FIG. 11 is a side view of a portion of an exemplary micro-hermetic package.
Figure 12:
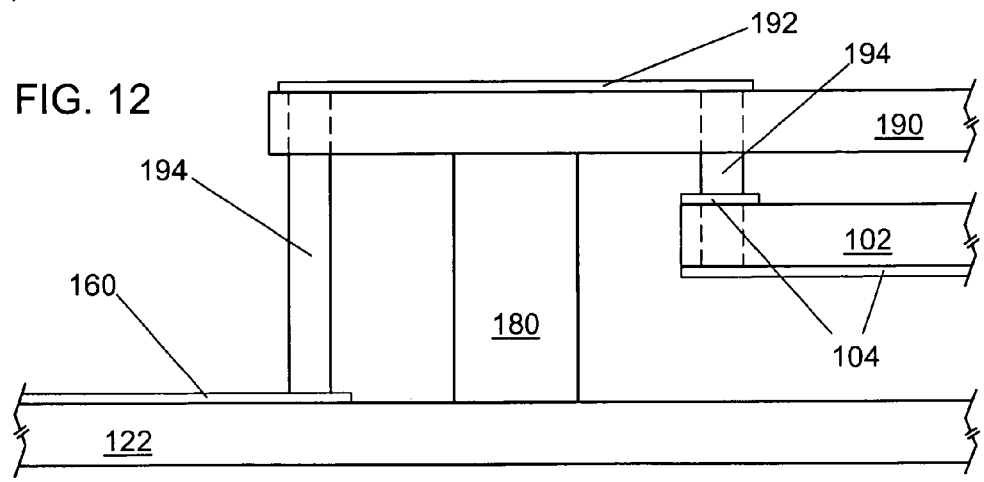
FIG. 12 is a side view of a portion of an exemplary micro-hermetic package.
Figure 6A:
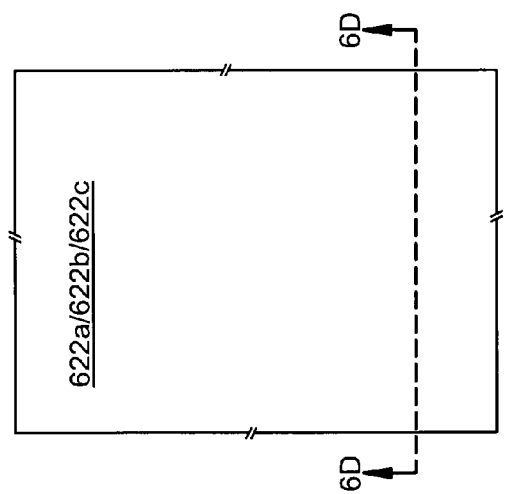
FIGS. 6A–6H illustrate exemplary process steps for forming a micro-hermetic package.
Figure 6B:
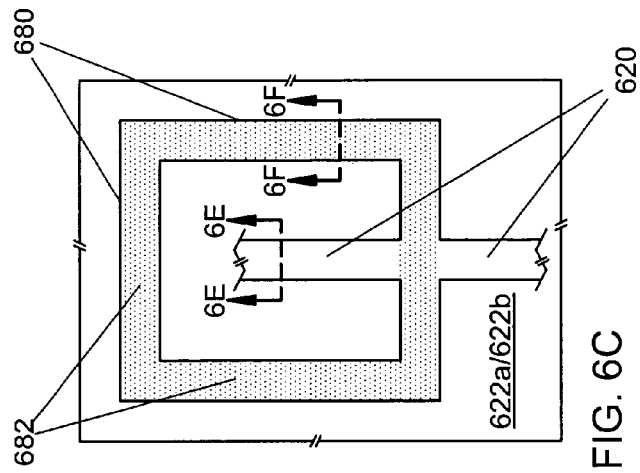
Figure 6C:
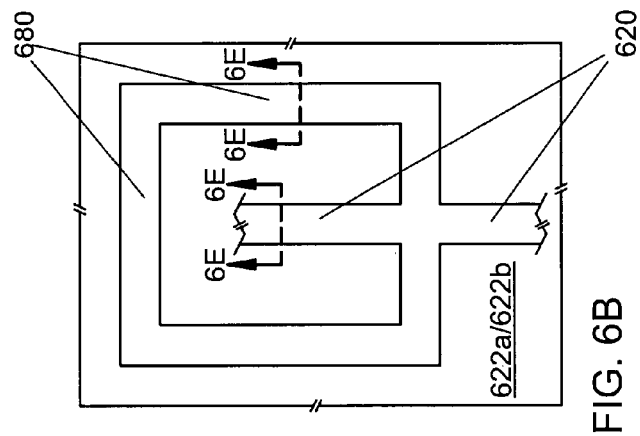
Figure 6D:
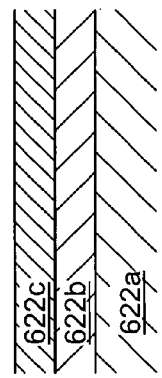
Figure 6E:
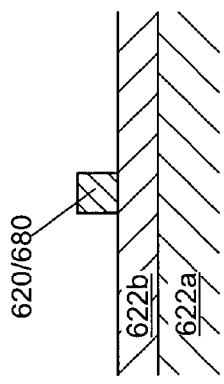
Figure 6F:
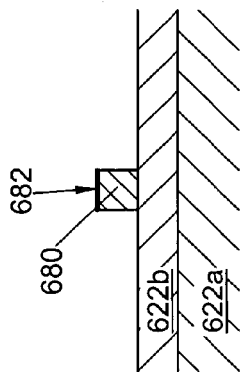

Lid 190 may provide additional functionality. For example, instead of providing electrical feed-throughs 160 as metal films passing below ring 180 on substrate 122, the metal films may instead be discontinuous at ring 180. Corresponding metal contacts 194 may be provided on lid 190 which protrude downward and establish electrical contacts with feed-through conductors 160 (FIG. 11). These contacts 194 may extend through lid 190 and a metallic film 192 on the top surface of (or within) lid 190 may establish continuity of the electrical feed-throughs when sealed onto ring 180. Alternatively, contacts may be provided on lid 190 for connecting directly to a metal contact 104 on device substrate 102 without descending back to substrate 122 (FIG. 12). Alternatively, outside electrical connections may be provided solely through lid 190 to contacts on device substrate 102 and on substrate 122 within ring 180, with no conductors on substrate 122 beneath or outside ring 180 (in which case the restriction that ring 180 must be insulating is relaxed, and ring 180 could be formed from solder or other metallic material). These alternative electrical feed-through configurations may be particularly desirable in instances of substrate/ring material combinations for which the presence of metallic conductors on substrate 122 may degrade mechanical adherence of ring 180 to substrate 122, or where materials or material processing steps for providing ring 180 are incompatible with the presence of metal coatings 160. Lid 190 may also carry circuitry for generating, modifying, and/or monitoring electronic signal provided to device 110 through contacts 194. A transparent lid 190 may provide optical access to device 110 for monitoring and/or for application of optical control signals. Lid 190 may provide thermal monitoring and/or thermal contact for temperature control, or may serve as a heat sink. Lid 190 may be implemented using optical bench technologies for providing additional functionality.

Figure 13A:
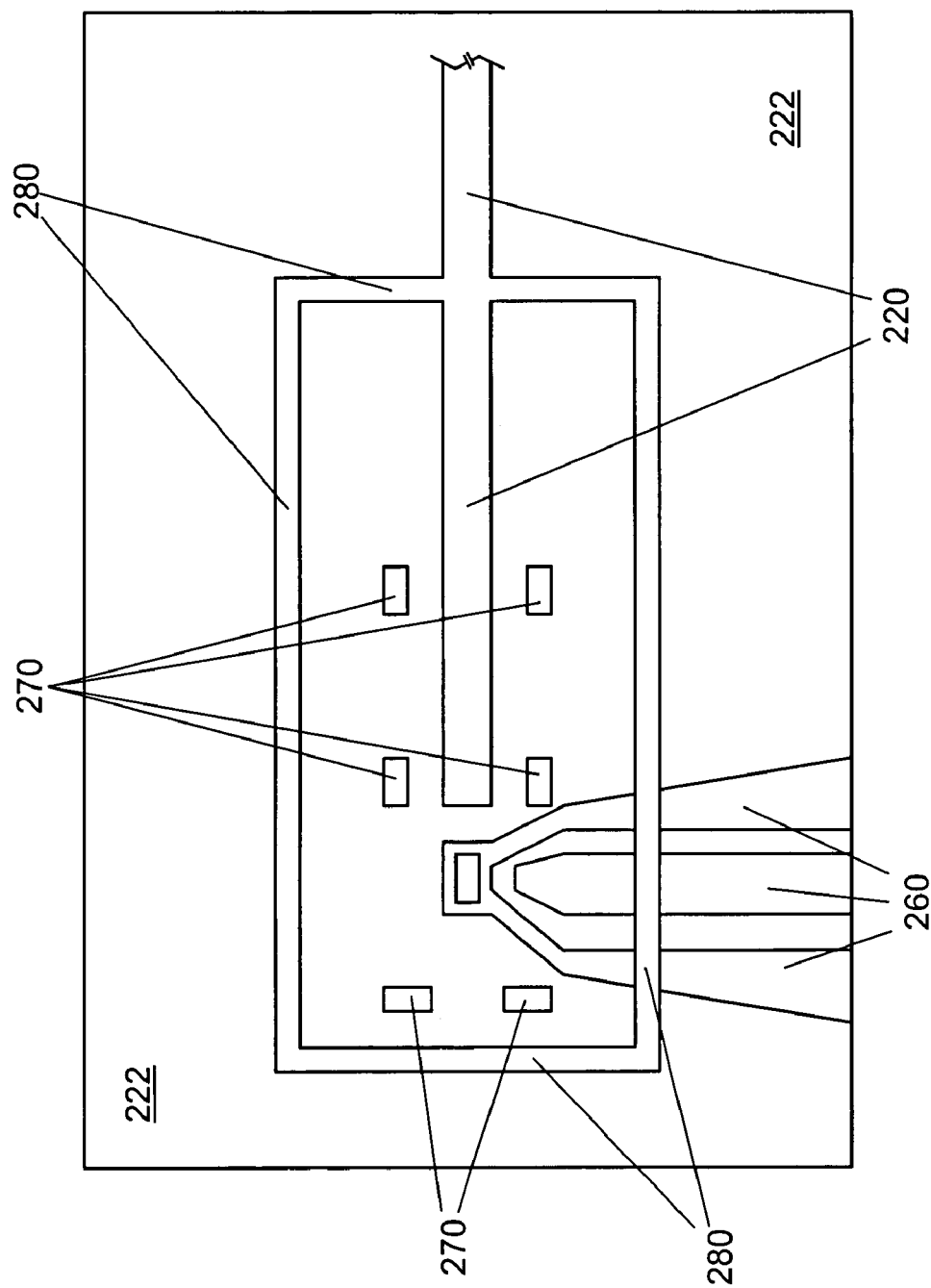
FIG. 13A is a top view of a planar waveguide substrate with a ring for micro-hermetic sealing.

In other exemplary embodiments of apparatus and methods for micro-hermetic packaging of optical devices, a device substrate 202 may also serve as a lid for micro-hermetic sealing of the optical apparatus. FIGS. 13A–13C show a waveguide substrate 222 with a transmission waveguide 220 thereon with a sealing ring 280, electrical contacts 260, and alignment/support members 270. An optical device 210 is shown on device substrate 202 along with waveguide 230. Substrate 202 is preferably adapted to engage members 270 so as to position waveguide 220 and 230 for transverse-transfer of optical power therebetween (although any other manner of optical power transfer between device 210 and waveguide 220 may be equivalently employed, including end-transfer). Substrate 202 is also adapted for establishing a seal with the top surface of ring 280, by soldering (ring 280 and/or substrate 202 being provided with metal coatings for enabling the same; metal coatings not shown) or by any other suitable sealing means. Substrate 202 preferably mechanically engages members 270 before engaging ring 280, with any gap remaining between ring 280 and substrate 202 filled by solder reflow. In this way accurate positioning of device 210 and waveguide 230 relative to waveguide 220 does not depend on the accuracy or reproducibility of the soldering process. Substrate 202 may be provided with a sealing ring 203, thereby forming a lid with a recessed central portion on the underside, in this case partially occupied by the device 210 and waveguide 230. A sealing ring 203 thus provided on substrate 202 may either mate with the sealing ring 280, or completely replace sealing ring 280 (if suitably adapted to accommodate waveguide 220 therethrough). Fabrication of a sealing ring 203 on device substrate 202 may preferably be achieved using fabrication/processing techniques compatible with those employed to fabricate device 210 and waveguide 230, thereby enabling precision alignment thereof. Such precision alignment may be achieved for multiple devices (tens or hundreds or thousands) and corresponding sealing rings during concurrent fabrication on a common substrate or wafer. A combination device substrate and lid 202 may be further adapted for providing electrical feed-throughs as shown in FIGS. 11–12 and described hereinabove, or may provide circuitry and/or other functionality and described hereinabove.

For purposes of the foregoing written description and/or the appended claims, "index" may denote the bulk refractive index of a particular material (also referred to herein as a "material index") or may denote an "effective index" $n_{eff}$, related to the propagation constant $\beta$ of a particular optical mode in a particular optical element by $\beta = 2\pi n_{eff}/\lambda$. The effective index may also be referred to herein as a "modal index". As referred to herein, the term "low-index" shall denote any materials and/or optical structures having an index less than about 2.5, while "high-index" shall denote any materials and/or structures having an index greater than about 2.5. Within these bounds, "low-index" may refer to: silica ($SiO_x$), germano-silicate, boro-silicate, other doped silicas, and/or other silica-based materials; silicon nitride ($Si_xN_y$) and/or silicon oxynitrides ($SiO_xN_y$); other glasses; other oxides; various polymers; and/or any other suitable optical materials having indices below about 2.5. "Low-index" may also include optical fiber, optical waveguides, planar optical waveguides, and/or any other optical components incorporating such materials and/or exhibiting a modal index below about 2.5. Similarly, "high-index" may refer to materials such as semiconductors, IR materials, and/or any other suitable optical materials having indices greater than about 2.5, and/or optical waveguides of any suitable type incorporating such material and/or exhibiting a modal index greater than about 2.5. The terms "low-index" and "high-index" are to be distinguished from the terms "lower-index" and "higher-index", also employed herein. "Low-index" and "high-index" refer to an absolute numerical value of the index (greater than or less than about 2.5), while "lower-index" and "higher-index" are relative terms indicating which of two particular materials has the larger index, regardless of the absolute numerical values of the indices.

For purposes of the foregoing written description and/or the appended claims, the term "optical waveguide" (or equivalently, "waveguide") as employed herein shall denote a structure adapted for supporting one or more optical modes. Such waveguides shall typically provide confinement of a supported optical mode in two transverse dimensions while allowing propagation along a longitudinal dimension. The transverse and longitudinal dimensions/directions shall be defined locally for a curved waveguide; the absolute orientations of the transverse and longitudinal dimensions may therefore vary along the length of a curvilinear waveguide, for example. Examples of optical waveguides may include, without being limited to, various types of optical fiber and various types of planar waveguides. The term "planar optical waveguide" (or equivalently, "planar waveguide") as employed herein shall denote any optical waveguide that is provided on a substantially planar substrate. The longitudinal dimension (i.e., the propagation dimension) shall be considered substantially parallel to the substrate. A transverse dimension substantially parallel to the substrate may be referred to as a lateral or horizontal dimension, while a transverse dimension substantially perpendicular to the substrate may be referred to as a vertical dimension. Examples of such waveguides include ridge waveguides, buried waveguides, semiconductor waveguides, other high-index waveguides ("high-index" being above about 2.5), silica-based waveguides, polymer waveguides, other low-index waveguides ("low-index" being below about 2.5), core/clad type waveguides, multi-layer reflector (MLR) waveguides, metal-clad waveguides, air-guided waveguides, vacuum-guided waveguides, photonic crystal-based or photonic bandgap-based waveguides, waveguides incorporating electro-optic (EO) and/or electro-absorptive (EA) materials, waveguides incorporating non-linear-optical (NLO) materials, and myriad other examples not explicitly set forth herein which may nevertheless fall within the scope of the present disclosure and/or appended claims. Many suitable substrate materials may be employed, including semiconductor, crystalline, silica or silica-based, other glasses, ceramic, metal, and myriad other examples not explicitly set forth herein which may nevertheless fall within the scope of the present disclosure and/or appended claims.

One exemplary type of planar optical waveguide that may be suitable for use with optical components disclosed herein is a so-called PLC waveguide (Planar Lightwave Circuit). Such waveguides typically comprise silica or silica-based waveguides (often ridge or buried waveguides; other waveguide configuration may also be employed) supported on a substantially planar silicon substrate (typically with an interposed silica or silica-based optical buffer layer). Sets of one or more such waveguides may be referred to as planar waveguide circuits, optical integrated circuits, or opto-electronic integrated circuits. A PLC substrate with one or more PLC waveguides may be readily adapted for mounting one or more optical sources, lasers, modulators, and/or other optical devices adapted for end-transfer of optical power with a suitably adapted PLC waveguide. A PLC substrate with one or more PLC waveguides may be readily adapted (according to the teachings of earlier-cited U.S. App. Ser. No. 60/334,705, U.S. App. No. 60/360,261, U.S. application Ser. No. 10/187,030, and/or U.S. App. No 60/466,799) for mounting one or more optical sources, lasers, modulators, and/or other optical devices adapted for transverse-transfer of optical power with a suitably adapted PLC waveguide (mode-interference-coupled, or substantially adiabatic, transverse-transfer; also referred to as transverse-coupling).

For purposes of the foregoing written description and/or appended claims, "spatially-selective material processing techniques" shall encompass epitaxy, layer growth, lithography, photolithography, evaporative deposition, sputtering, vapor deposition, chemical vapor deposition, beam deposition, beam-assisted deposition, ion beam deposition, ion-beam-assisted deposition, plasma-assisted deposition, wet etching, dry etching, ion etching (including reactive ion etching), ion milling, laser machining, spin deposition, spray-on deposition, electrochemical plating or deposition, electroless plating, photo-resists, UV curing and/or densification, micro-machining using precision saws and/or other mechanical cutting/shaping tools, selective metallization and/or solder deposition, chemical-mechanical polishing for planarizing, any other suitable spatially-selective material processing techniques, combinations thereof, and/or functional equivalents thereof. In particular, it should be noted that any step involving "spatially-selectively providing" a layer or structure may involve either or both of: spatially-selective deposition and/or growth, or substantially uniform deposition and/or growth (over a given area) followed by spatially-selective removal. Any spatially-selective deposition, removal, or other process may be a so-called direct-write process, or may be a masked process. It should be noted that any "layer" referred to herein may comprise a substantially homogeneous material layer, or may comprise an inhomogeneous set of one or more material sub-layers. Spatially-selective material processing techniques may be implemented on a wafer scale for simultaneous fabrication/processing of multiple structures on a common substrate wafer.

It should be noted that various components, elements, structures, and/or layers described herein as "secured to", "connected to", "deposited on", "formed on", or "positioned on" a substrate may make direct contact with the substrate material, or may make contact with one or more layer(s) and/or other intermediate structure(s) already present on the substrate, and may therefore be indirectly "secured to", etc, the substrate.

The phrase "operationally acceptable" appears herein describing levels of various performance parameters of optical components and/or optical devices, such as optical power transfer efficiency (equivalently, optical coupling efficiency), optical loss, undesirable optical mode coupling, and so on. An operationally acceptable level may be determined by any relevant set or subset of applicable constraints and/or requirements arising from the performance, fabrication, device yield, assembly, testing, availability, cost, supply, demand, and/or other factors surrounding the manufacture, deployment, and/or use of a particular optical device. Such "operationally acceptable" levels of such parameters may therefor vary within a given class of devices depending on such constraints and/or requirements. For example, a lower optical coupling efficiency may be an acceptable trade-off for achieving lower device fabrication costs in some instances, while higher optical coupling may be required in other instances in spite of higher fabrication costs. The "operationally acceptable" coupling efficiency therefore varies between the instances. In another example, higher optical loss (due to scattering, absorption, undesirable optical coupling, and so on) may be an acceptable trade-off for achieving lower device fabrication cost or smaller device size in some instances, while lower optical loss may be required in other instances in spite of higher fabrication costs and/or larger device size. The "operationally acceptable" level of optical loss therefore varies between the instances. Many other examples of such trade-offs may be imagined. Optical devices and fabrication methods therefor as disclosed herein, and equivalents thereof, may therefore be implemented within tolerances of varying precision depending on such "operationally acceptable" constraints and/or requirements. Phrases such as "substantially adiabatic", "substantially spatial-mode-matched", "substantially modal-index-matched", "so as to substantially avoid undesirable optical coupling", and so on as used herein shall be construed in light of this notion of "operationally acceptable" performance.

While particular examples have been disclosed herein employing specific materials and/or material combinations and having particular dimensions and configurations, it should be understood that many materials and/or material combinations may be employed in any of a variety of dimensions and/or configurations while remaining within the scope of inventive concepts disclosed and/or claimed herein.

It is intended that equivalents of the disclosed exemplary embodiments and methods shall fall within the scope of the present disclosure and/or appended claims. It is intended that the disclosed exemplary embodiments and methods, and equivalents thereof, may be modified while remaining within the scope of the present disclosure and/or appended claims.

What is claimed is:

1. An optical apparatus, comprising:
   a planar waveguide substrate;
   a micro-hermetic cavity formed on the waveguide substrate;
   a planar transmission optical waveguide formed on the waveguide substrate for enabling optical power transfer between an interior volume of the micro-hermetic cavity and a volume exterior thereto; and
   means for sealing the micro-hermetic cavity,
   wherein:
   walls of the micro-hermetic cavity completely circumscribe the interior volume; and
   a portion of the transmission optical waveguide integrally forms a portion of one of the walls of the micro-hermetic cavity at a position where the waveguide passes through the wall.

2. The apparatus of claim 1, wherein the micro-hermetic cavity and the transmission optical waveguide are formed concurrently using a common material processing sequence.

3. The apparatus of claim 2, wherein material forming the micro-hermetic cavity comprises core material or cladding material, the core material and the cladding material also forming the transmission optical waveguide.

4. The apparatus of claim 1, further comprising:
   multiple transmission optical waveguides formed concurrently on a common substrate wafer; and
   multiple corresponding micro-hermetic cavities formed concurrently on the common substrate wafer, wherein division of the substrate wafer results in multiple individual waveguide substrates having thereon at least one of the transmission optical waveguides and the corresponding micro-hermetic cavity.

5. The apparatus of claim 1, the sealing means comprising a lid sealed around a perimeter of the micro-hermetic cavity, thereby separating the interior volume thereof from the volume exterior thereto.

6. An optical apparatus, comprising:
a planar waveguide substrate;
a micro-hermetic cavity formed on the waveguide substrate;
a planar transmission optical waveguide formed on the waveguide substrate for enabling optical power transfer between an interior volume of the micro-hermetic cavity and a volume exterior thereto; and
means for sealing the micro-hermetic cavity,
the sealing means comprising a lid sealed around a perimeter of the micro-hermetic cavity, thereby separating the interior volume thereof from the volume exterior thereto.
the micro-hermetic cavity formed from core material and cladding material, the core material and cladding material also forming the transmission optical waveguide, and the core material and cladding material that form the micro-hermetic cavity vertically arranged in substantially the same manner as the core material and cladding material that form the transmission optical waveguide, thereby forming a substantially flat upper surface around the perimeter of the micro-hermetic cavity for sealing the lid.

7. An optical apparatus, comprising:
a planar waveguide substrate;
a micro-hermetic cavity formed on the waveguide substrate;
a planar transmission optical waveguide formed on the waveguide substrate for enabling optical power transfer between an interior volume of the micro-hermetic cavity and a volume exterior thereto; and
means for sealing the micro-hermetic cavity,
the sealing means comprising a lid sealed around a perimeter of the micro-hermetic cavity, thereby separating the interior volume thereof from the volume exterior thereto.
wherein material deposited over at least a portion of the transmission optical waveguide forms a substantially flat upper surface of the perimeter of the micro-hermetic cavity for sealing the lid.

8. The apparatus of claim 1, further comprising at least one optical device assembled onto the waveguide substrate within the micro-hermetic cavity so as to enable optical power transfer between the optical device and the transmission optical waveguide.

9. An optical apparatus, comprising:
a planar waveguide substrate;
a micro-hermetic cavity formed on the waveguide substrate;
a planar transmission optical waveguide formed on the waveguide substrate for enabling optical power transfer between an interior volume of the micro-hermetic cavity and a volume exterior thereto;
means for sealing the micro-hermetic cavity; and
at least one optical device assembled onto the waveguide substrate within the micro-hermetic cavity so as to enable optical power transfer between the optical device and the transmission optical waveguide,
the sealing means comprising a lid sealed around a perimeter of the micro-hermetic cavity, the optical device formed on the lid, the lid serving as a device substrate, sealing the lid onto the micro-hermetic cavity serving to position the optical device so as to enable optical power transfer between the optical device and the transmission optical waveguide.

10. The apparatus of claim 8, the lid being adapted for conveying signals between the optical device and the volume exterior to the micro-hermetic cavity.

11. The apparatus of claim 1, wherein the transmission optical waveguide is adapted for reducing optical loss induced by the presence of the micro-hermetic cavity.

12. The apparatus of claim 11, further comprising a reflective coating formed on an upper surface of that portion of the transmission optical waveguide that intersects a perimeter of the micro-hermetic cavity.

13. The apparatus of claim 11, further comprising a thickened upper cladding layer formed on that portion of the transmission optical waveguide that intersects a perimeter of the micro-hermetic cavity.

14. The apparatus of claim 11, further comprising an upper core and a lower core formed within the transmission optical waveguide, the upper and lower cores separated by cladding material, the upper core contained within the micro-hermetic cavity, the lower core enabling optical power transfer between the interior and exterior volumes of the micro-hermetic cavity, the upper and lower cores positioned for transverse-transfer of optical power therebetween within the micro-hermetic cavity.

15. The apparatus of claim 1, the sealing means comprising an embedding medium at least partly filling the micro-hermetic cavity.

16. A method comprising:
forming a micro-hermetic cavity on a planar waveguide substrate;
forming a planar transmission optical waveguide on the waveguide substrate for enabling optical power transfer between an interior volume of the micro-hermetic cavity and a volume exterior thereto; and
sealing the micro-hermetic cavity,
wherein:
walls of the micro-hermetic cavity completely circumscribe the interior volume; and
a portion of the transmission optical waveguide integrally forms a portion of one of the walls of the micro-hermetic cavity at a position where the waveguide passes through the wall.

17. The method of claim 16, wherein the micro-hermetic cavity and the transmission optical waveguide are formed concurrently using a common material processing sequence.

18. The method of claim 16,
wherein multiple transmission optical waveguides are formed concurrently on a common substrate wafer,
wherein multiple corresponding micro-hermetic cavities are formed concurrently on the common substrate wafer, and
further comprising dividing the substrate wafer into individual waveguide substrates having thereon at least one of the transmission optical waveguides and the corresponding micro-hermetic cavity.

19. The method of claim 16, wherein a lid sealed around a perimeter of the micro-hermetic cavity is employed for sealing the optical device within the micro-hermetic cavity.

20. The method of claim 16, further comprising assembling at least one optical device onto the waveguide substrate within the micro-hermetic cavity so as to enable optical power transfer between the optical device and the transmission optical waveguide.

21. The method of claim 16, further comprising adapting the transmission optical waveguide for reducing optical loss induced by the presence of the micro-hermetic cavity.

22. The method of claim 16, further comprising at least partly filling the micro-hermetic cavity with an embedding medium, thereby sealing the micro-hermetic cavity.

* * * * *

UNITED STATES PATENT AND TRADEMARK OFFICE
CERTIFICATE OF CORRECTION

PATENT NO.      : 6,981,806 B2                                      Page 1 of 1
APPLICATION NO. : 10/613226
DATED           : January 3, 2006
INVENTOR(S)     : Benzoni et al.

It is certified that error appears in the above-identified patent and that said Letters Patent is hereby corrected as shown below:

On the Title Page

| | |
|---|---|
| (60) Related U.S. Application Data | Insert --provisional application No. 60/466,799, filed on April 29, 2003-- |
| Column 17, line 21, Claim 6 | Delete ".", Insert --,-- |
| Column 17, line 44, Claim 7 | Delete ".", Insert --,-- |

Signed and Sealed this

Eighth Day of August, 2006

JON W. DUDAS
*Director of the United States Patent and Trademark Office*